(12) United States Patent
Nankervis et al.

(10) Patent No.: US 6,408,600 B1
(45) Date of Patent: Jun. 25, 2002

(54) WRAPPING APPARATUS AND PROCESS

(75) Inventors: Wayne T. Nankervis, Hortonville; Neal R. Monigal, Menasha; Alan R. Wanek, Green Bay; Richard D. Sorenson, Sheboygan; Jeffrey A. Ginzl, Green Bay; Matt L. Brugman, Green Bay; Brian L. Hopkinson, Green Bay, all of WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 09/579,104

(22) Filed: May 25, 2000

(51) Int. Cl.$^7$ .......................... B65B 51/10; B65B 51/18
(52) U.S. Cl. ................................. 53/477; 53/567
(58) Field of Search ..................... 53/450, 451, 477, 53/550, 551, 552, 553, 554, 555, 131.1, 373.9, 374.6, 374.5, 371.5, 371.6, 372.4, 375.4, 479, 567

(56) References Cited

U.S. PATENT DOCUMENTS

| | | | |
|---|---|---|---|
| 3,815,313 A | * 6/1974 | Heisler | 53/14 |
| 3,955,338 A | * 5/1976 | Winzeler et al. | 53/180 |
| 4,430,844 A | 2/1984 | James | |
| 4,546,595 A | * 10/1985 | Yasumune | 53/450 |
| 4,765,474 A | 8/1988 | James | |
| 5,109,654 A | * 5/1992 | Suga | 53/511 |
| 5,220,771 A | * 6/1993 | Burns | 53/551 |
| 5,228,273 A | 7/1993 | Kovacs | |
| 5,255,495 A | 10/1993 | Kovacs | |
| 5,302,227 A | * 4/1994 | Dalrymple et al. | 156/443 |
| 5,406,887 A | 4/1995 | Hertel | |
| 5,433,063 A | * 7/1995 | Kovacs et al. | 53/550 |
| 5,799,467 A | 9/1998 | Nankervis | |

* cited by examiner

Primary Examiner—Rinaldi I. Rada
Assistant Examiner—Hemant M Desai

(57) ABSTRACT

A sealing apparatus includes a plurality of pairs of upper and lower sealing die assemblies which travel around upper and lower pairs of oval tracks. Each of the oval tracks includes upper and lower horizontal portions and front and rear curved end portions. Each pair of die assemblies is driven independently of the other pairs. Each of the die assemblies includes a pair of carriages which are supported by the tracks and a sealing die which extends between the carriages. A pair of bogie arms are pivotally mounted on each of the carriages, and a pair of rollers which are rotatably mounted on each bogie arm ride on one of the tracks.

The sealing apparatus seals a series of products in a plastic film as the products and film are advanced along a horizontal path which extends between the upper tracks and between the lower tracks. A first pair of upper and lower sealing dies engage the film behind a first product and in front of a second product as the first dies move along the curved rear end portions of the tracks. The first dies push the film against the rear of the first product and seal and sever the film as the first dies move along the horizontal portion of the tracks. A second pair of dies engage the film behind the second product and repeat the sealing and severing operation.

16 Claims, 21 Drawing Sheets

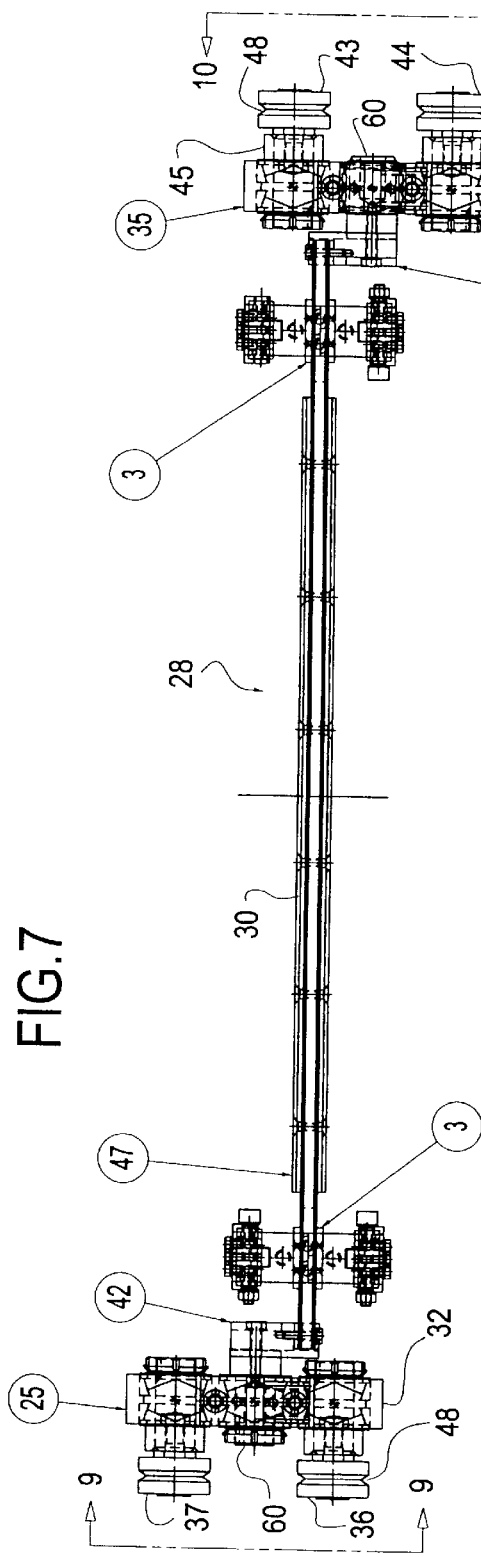
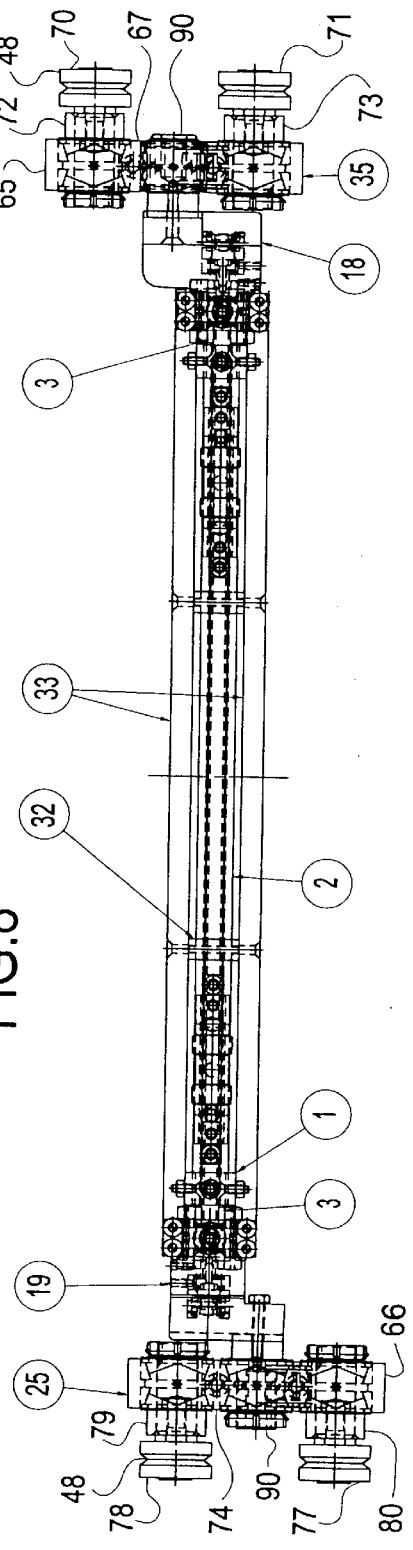
FIG.7
FIG.8

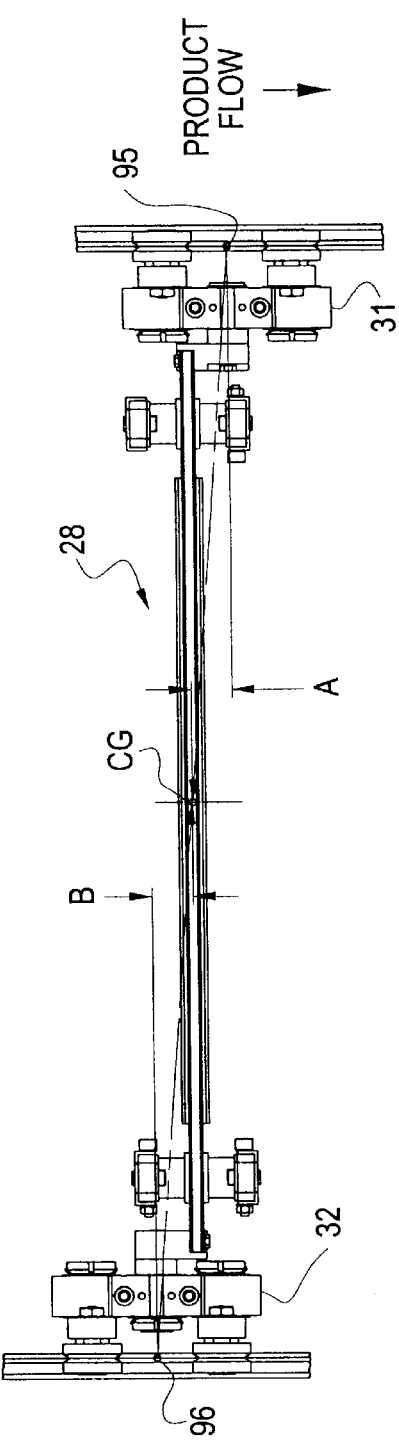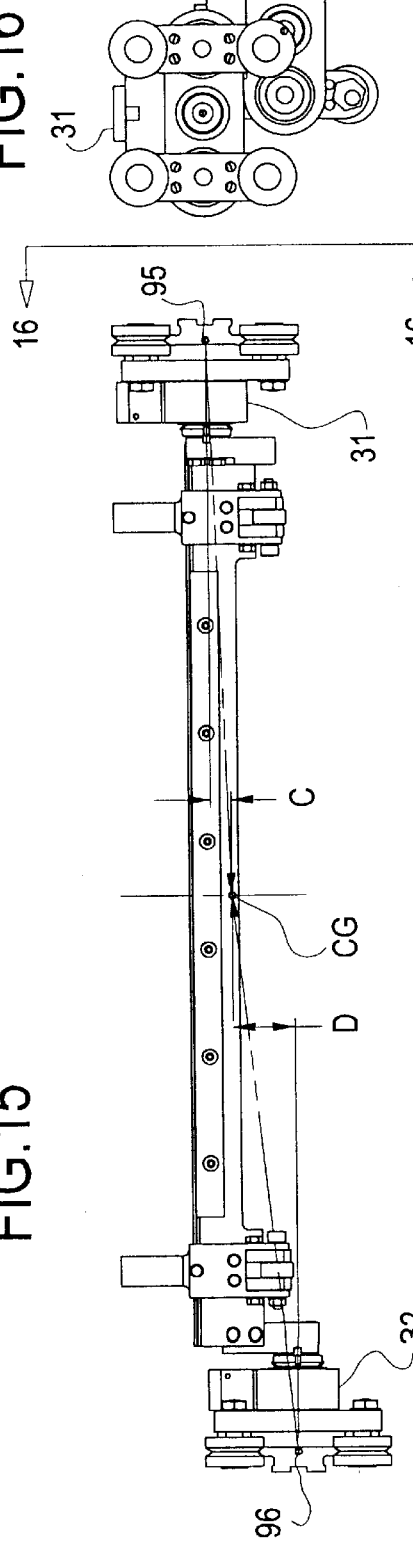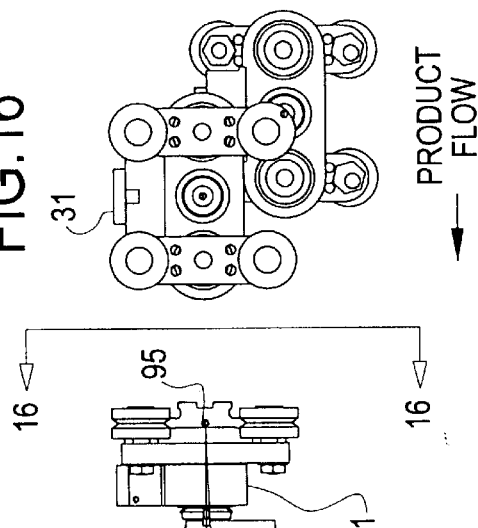

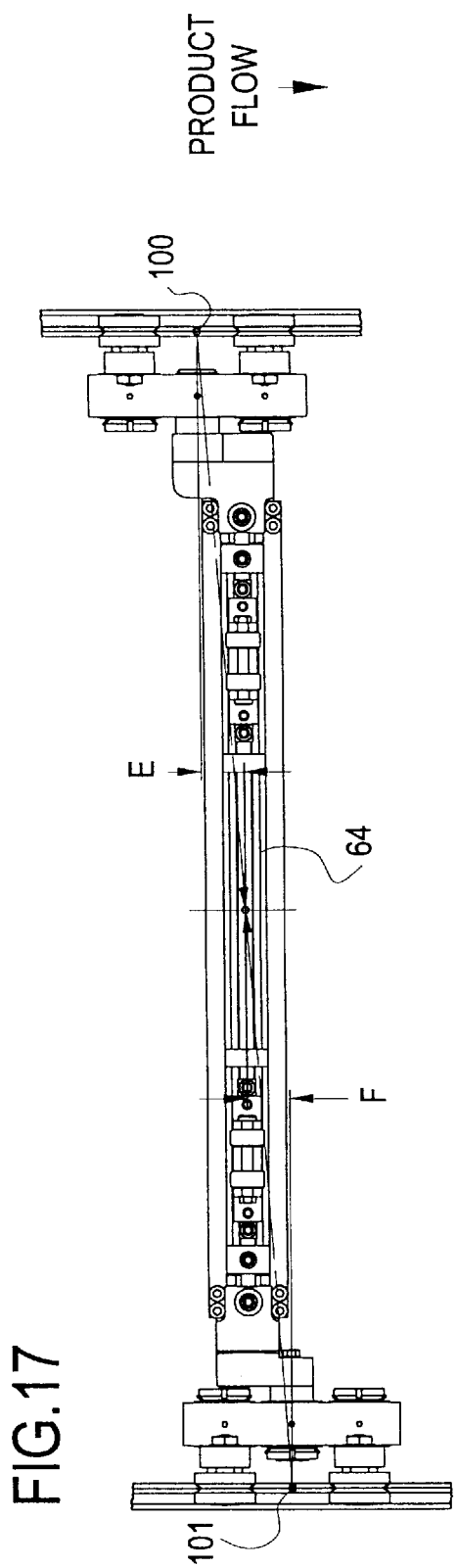
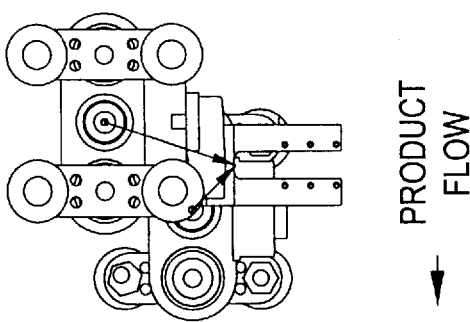
FIG.19
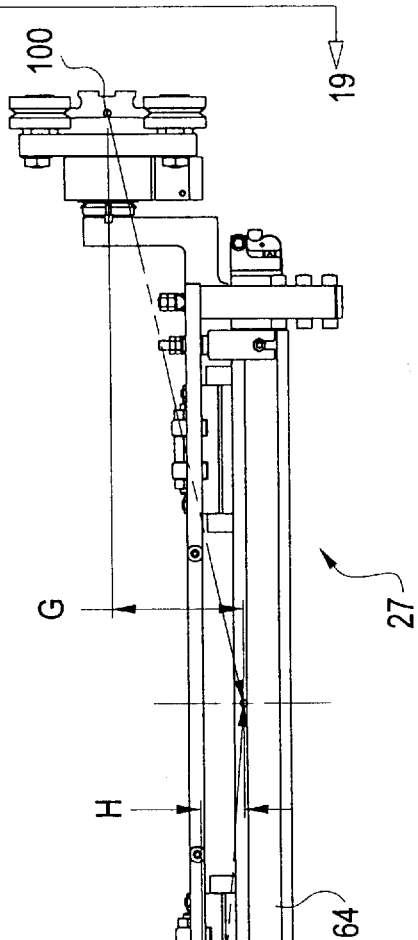
FIG.17
FIG.18

WRAPPING APPARATUS AND PROCESS

BACKGROUND

A. Wrapping Apparatus and Process

This invention relates to machines for packaging individual rolls or groups of rolls in a film. Such machines are described in detail in U.S. Pat. Nos. 5,433,063, 5,228,273, 4,430,844, 5,255,495 and U.S. patent application Ser. Nos. 08/147,153 and 08/143,455 now U.S. Pat. No. 5,462,013.

Such packaging machines are particularly useful for wrapping rolls of bathroom tissue or household paper towels. Such rolls conventionally include a core and paper wound around the core. One or more wound rolls are overwrapped with a tube of plastic film, and the edges of the film are sealed to form a package.

Prior to this invention, the overwrapping process was continuous motion, consisting of multiple lane product infeed choke belt conveyors. The conveyors feed product in time to a flighted chain conveyor in the desired package format across a dead plate to an overhead chain conveyor with attached product pusher paddles. The product continues to be conveyed in time, pushed by the overhead conveyor pusher paddles across another dead plate to a girth former which overwraps the product with continuously unwound film from an unwind positioned at 90° to the flow of product through the machine. The film entubes the product is then overlapped and sealed in a longitudinal direction. The wrapped product is advanced downstream via conveyor pull belts, and perforations in the film produced at the unwind section are severed by timed paddles which impinge the sealed tube of film exactly where the circumferential perforations are positioned exactly halfway between the entubed wrapped products. At this point, the longitudinally sealed overwrapped product becomes separated at the film perforations. Film extending beyond the ends of the product remain for sealing the ends of the package downstream later in the process.

The product continues to be transported via conveyor belts and then is transferred by an overhead chain conveyor with pushers attached which are timed to convey product at 30° to the direction of flow. Another chain conveyor with pushers attached traveling beneath a dead plate on which the product rests intercepts the product and pushes it a full 90° from the initial direction of travel. While the product continues to be conveyed, air blasts, fixed slotted plates, and flex wipe brush conveyors guide and fold the film on the ends of the product in the same manner as if wrapping a gift. Once the film has been folded, the product is conveyed between moving Teflon® belts which transport the product via the ends of the package. The belts pass over spring loaded fixed heaters to seal the plastic film on the package ends. The belts continue to transport the package through an unheated area while still maintaining the package under compression to permit cooling of the sealed film.

Products can be packaged with cores up or down and in one or two levels of product. A customer perforation can also be added to the package as an option provided in the film unwind section. The machine sections are driven by a plurality of AC servo motors at guaranteed speeds for individually wrapping rolls of household paper towels at up to 250 packages per minute (ppm).

B. Sealing Dies

The ends of the package are sealed by top and bottom sealing dies which close on the film between products. U.S. Pat. No. 5,433,063 describes how the sealing dies (and half dies) are positioned on belts (two half dies located 180° apart on each belt), how they are driven, the velocity profile of the dies, how power is transmitted to the belts, and the ability for the dies to be rotated about shaft interlinks on the pairs of belts to which they are attached. The sealing dies include four sealing wires and a cutoff knife.

U.S. Pat. No. 5,433,063 also describes multiple axes for independently driving each of the die sets at a variable velocity. The velocity of the axes relative to one another may be changed during a package making cycle without one die set interfering with any other die set. The actual velocity and acceleration of any given die at various positions within that die's travel is described in the patent.

The relationship of the velocity and acceleration of each die half with respect to the position of that die half within its travel is referred to as the motion profile. The profile described in the patent is based around the velocity of the film. The velocity of the die is equal to the film velocity as the die half makes contact with the film. The die half then slows down to collapse the film between the bundles. As the die continues around the radius of the pulley, it begins to accelerate back to film velocity. The die half (with the bundle in front of it) will travel at film velocity until the next die half (following the current one) touches the film. Then the first die half decelerates to allow the next die half to collapse the film tube. After that die half finishes collapsing the film tube, both will accelerate back to film velocity.

In U.S. Pat. No. 5,433,063, although not described, cam tracks are used in conjunction with cam followers mounted in various locations on the half dies. Together they serve as a means to control the orientation and path of travel of the half dies. The patent goes on to describe in column 3 that speeds of 45 packages per minute are attainable. This capability is based on a combination of the software programming for the velocity profile of the dies, the size of the servo motors/motion controllers, the inertia based on the weight of the dies and driven components, and the cam track geometry.

SUMMARY OF THE INVENTION

A. Wrapping Apparatus and Method

Like existing prior art, the invention is also a continuous motion apparatus and process. The invention may also incorporate a similar multiple lane product infeed choke belt conveyor and flighted chain conveyor. At this point the process can begin to differ. The ability to converge product in this area from three or four lanes of product rather than converging product upstream with a separate product diverting conveyor can be provided. Product then transfers from the flighted chain conveyor in time to an overhead conveyor with pushers that push product in time across a dead plate to the girth former. The machine can have a standard forming shoulder overhead and drop away dead plate. A girth former which is breathable or fixed overwraps product with continuously unwound film from an unwind positioned under the drop away dead plate in line with the machine. The film is not perforated. However, the film does entube the product and is then overlapped and sealed in a longitudinal direction in a manner similar to existing art. The entubed product continues downstream via conveyor side pull belts on either side of the product along with top and a bottom conveyor belts, again like existing art. Top pull belts can be substituted with fixed product hold down guides.

Unlike the prior art, this process continues in a straight line where product from the pull belt section transfers over a fixed dead plate and gap to the sealing section. The entubed product begins to travel at a slightly reduced speed, causing the pitch between the products to shorten. At this point the film gussets are tucked by timed air blasts simultaneously on each side of the package just before servo driven traveling top and bottom sealing dies close on the film between the packages. An impulse of current simultaneously seals leading and trailing packages on either side of the sealing dies and cuts the film to separate the packages. All of this is accomplished with one sealing/cutting wire. With a simplified die design, higher operating speeds are possible. Higher speeds are also made possible through the use of programming the software for the drive controllers of the servo motors to provide the appropriate velocity profile of the sealing die to achieve a given operating speed.

This process has been designed to package a single roll of household paper toweling or four rolls of bathroom tissue in a cores down application at an operating speed of 160 ppm. The design speed for the process is 200 ppm.

Although the specific embodiment described herein is for cores down and a single level of product, products can also be packaged cores up and in two levels as well. The invention can also accommodate product of varying individual roll density ranging from soft to hard and noncompressible product.

B. Sealing Dies

The construction and application of the motion profile of the sealing dies differs from the previous art in several significant ways. The new profile calculations are approached differently to begin with and, in the end, result in cubic motion throughout the entire profile. Cubic motion gradually changes the acceleration to reduce peak jerk levels and ease the burden on the mechanical assemblies.

The new profile consists of two major sections: the sealing move and the return move. The sealing move commences at the point where the die half first touches the film and ends when the die halves are no longer under pressure. At this point, the dies are no longer gripping the package, though they may be pushing it toward the discharge. The return move commences at this point and ends when the die half again touches the film and begins the sealing move for the next package.

In the previous art, the proximity switch was deemed the starting point of the profile. The die half would accelerate or decelerate from there to the point where it touched the film. The new profile calculations begin at the point where the die touches the film. From that point to the end of the sealing distance, all velocities and distances are directly determined by the dimensions of the cam track and package configuration. Once there are calculated, the entire distance from the end of the sealing move to the next die at film point is available for the return move. It is no longer limited in any way by the location of the proximity switch.

The new profile also eliminates several die profile parameters that, in the previous art, were required to configure the profile to different package sizes. For example, the "die offset 1" parameter was used to vary the space between the dies after they closed for differing package configurations. The new profile calculates all the necessary velocities and distances automatically for each configuration. It does this by comparing the master and slave travel distances throughout the sealing move, taking into account such variables as where the die will be placed between the packages, the distance the die must slow down to allow the incoming product to catch up with it, and the distance the lead package must slow down to collapse the film.

A return move is then calculated depending on the time and distance left after the sealing move is complete. A speed up segment may be added if it is determined that the die will impede the package as it exits the discharge.

The new profile is first developed as a quadratic profile with the eventual conversion to cubic motion as a major consideration. The previous art divided all speed up or slow down moves into standard trapezoidal motion where the master distance is evenly divided by three. The new profile calculations attempt to divide the moves evenly in two with the realization that the peak changes of acceleration will be smoothed out with the cubic motion conversion. Sometimes, however, a maximum or minimum velocity will force the addition of a third segment. The die during this segment will travel at this velocity limit for the minimum distance necessary and then resume acceleration. This keeps the acceleration rates at a minimum while remaining within velocity limits.

After this quadratic profile is calculated, it is then converted to the more complex cubic motion profile. Each segment of the quadratic profile that contains a change in velocity is divided in half, and the acceleration is distributed such that it is increasing during the first half and decreasing during the second half. This results in a curved velocity profile that significantly reduces abrupt changes in acceleration which, in turn, reduces mechanical stress on the moving parts and undesirable motion of the half dies as they touch the film and come together at the beginning of sealing.

The path of travel of the dies is controlled by a closed loop linear bearing hardened steel "V" track. Each edge of the track has an opposed "V" shape. It is comprised of two horizontal sections some distance apart while inline and parallel to each other. They are joined at each end by a full radius section. Its appearance resembles that of an oval "race track" positioned in a vertical plane. Four linear bearing and track systems are used to support and guide the half dies. Two of the linear bearing track systems are used to support and guide the upper half dies, and two support and guide the lower half dies. The tracks for the upper dies are offset to each other three inches horizontally and vertically. The dies are positioned between the tracks to split the difference between the total horizontal and vertical offset. In this way both the upper and lower half dies can maintain a vertical orientation throughout their path of travel. This is further achieved by a reduced center of gravity of the half dies with respect to their respective offset and to the design of the carriages to which the half dies are attached.

The carriages, like the previous art, utilize a rotatable shaft to permit the desired orientation of the half dies in conjunction with the linear bearing track systems. The carriages incorporate a center rotatable shaft opposed on either side by bogie arms. All of these components incorporate tapered roller bearings. The wheels attached to the bogie arms of the carriage have an opposed "V" profile which capture and travel on the opposed "V's" of the track. The design of the carriage imparts a particular stiffness which is important in maintaining control of the vertical position of the half dies at speed.

Mechanically, the carriages in conjunction with the geometry of the linear bearing track system make it possible to achieve a design speed of 200 packages per minute and an operating speed of 160 packages per minute. This is further made possible as a result of software programming for the velocity profile of the half dies and reduced component weight as previously mentioned. In addition to promoting higher speeds than the previous art, this invention provides a means for better control of the half dies by not utilizing a path of travel which incorporates vertical motion of the half dies. The only support the half dies have in the previous art when traveling vertically in their path of travel is that given by the belts to which the half dies are attached. The full radius sections of the track in this invention provide more support, stability and therefore control of the half dies while they are in motion.

DESCRIPTION OF THE DRAWING

The invention will be explained in conjunction with an illustrative embodiment shown in the accompanying drawing, in which:

FIG. 7 is a top view of the lower sealing die taken along the line 7—7 of FIG. 5;

FIG. 8 is a top view of the upper sealing die taken along the line 8—8 of FIG. 5;

FIG. 14 is a top view of the bottom die showing the horizontal offset of the die carriages;

FIG. 15 is a front view of the bottom die showing the vertical offset of the die carriages;

FIG. 16 is a side view of the bottom die taken along the line 16—16 of FIG. 15;

FIG. 17 is a top view of the top die showing the horizontal offset of the die carriages;

FIG. 18 is a front view of the top die showing the vertical offset of the die carriages;

FIG. 19 is a side view of the top die taken along the line 19—19 of FIG. 15;

DESCRIPTION OF SPECIFIC EMBODIMENT

Figure 1:
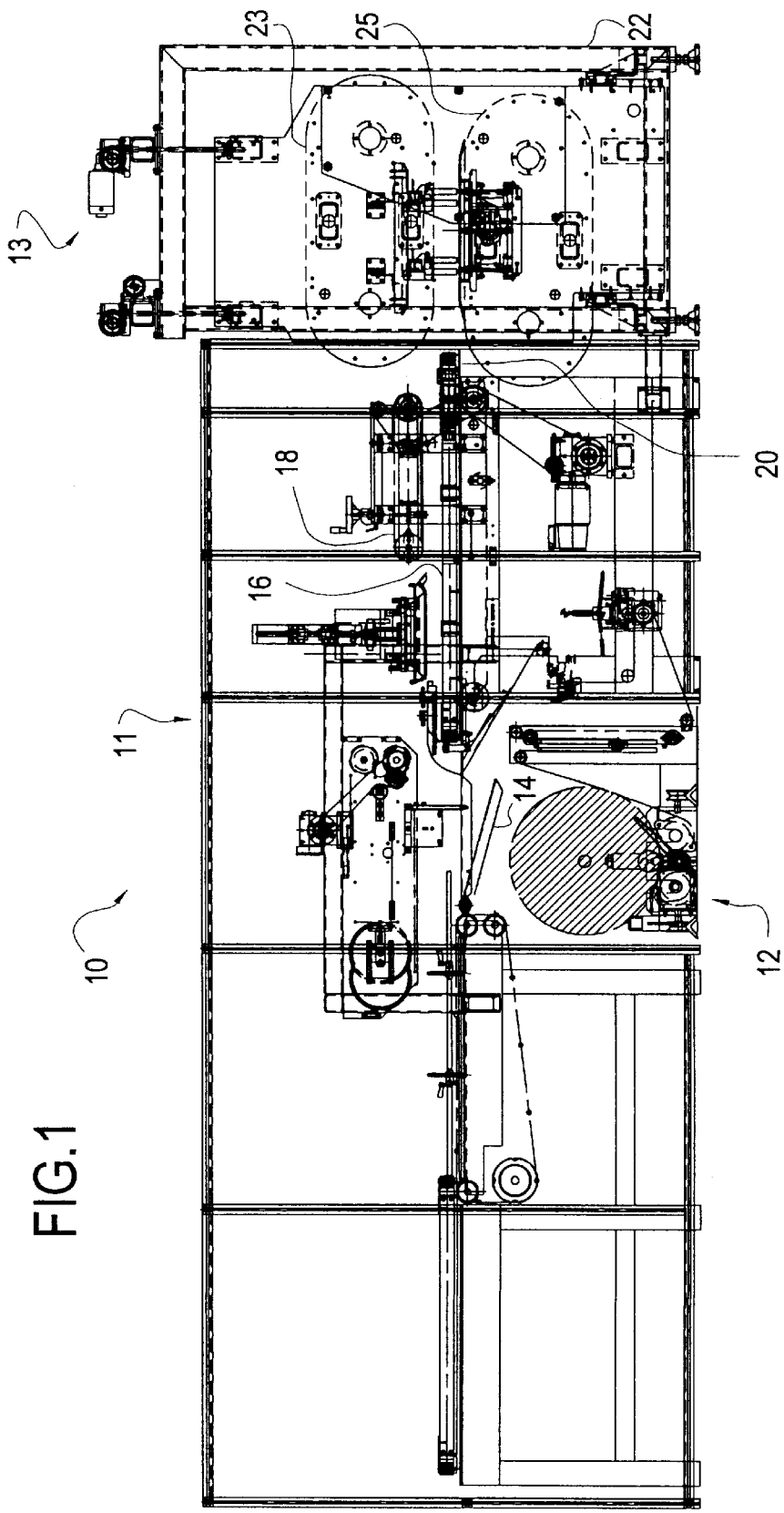
FIG. 1 is a side elevational view of a packaging apparatus in accordance with the invention.
Figure 2:
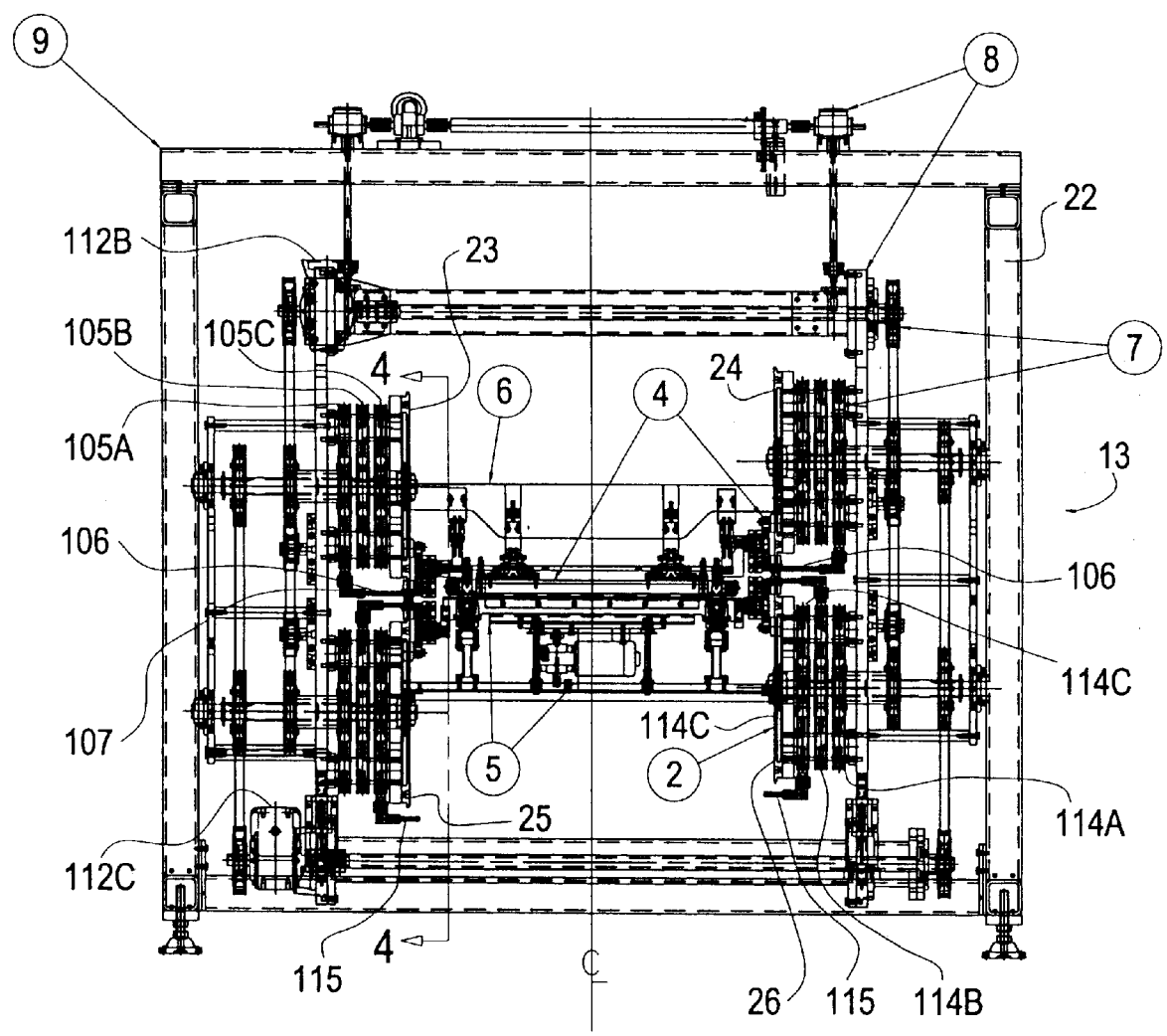
FIG. 2 is a front end view of the packaging apparatus.
Figure 3:
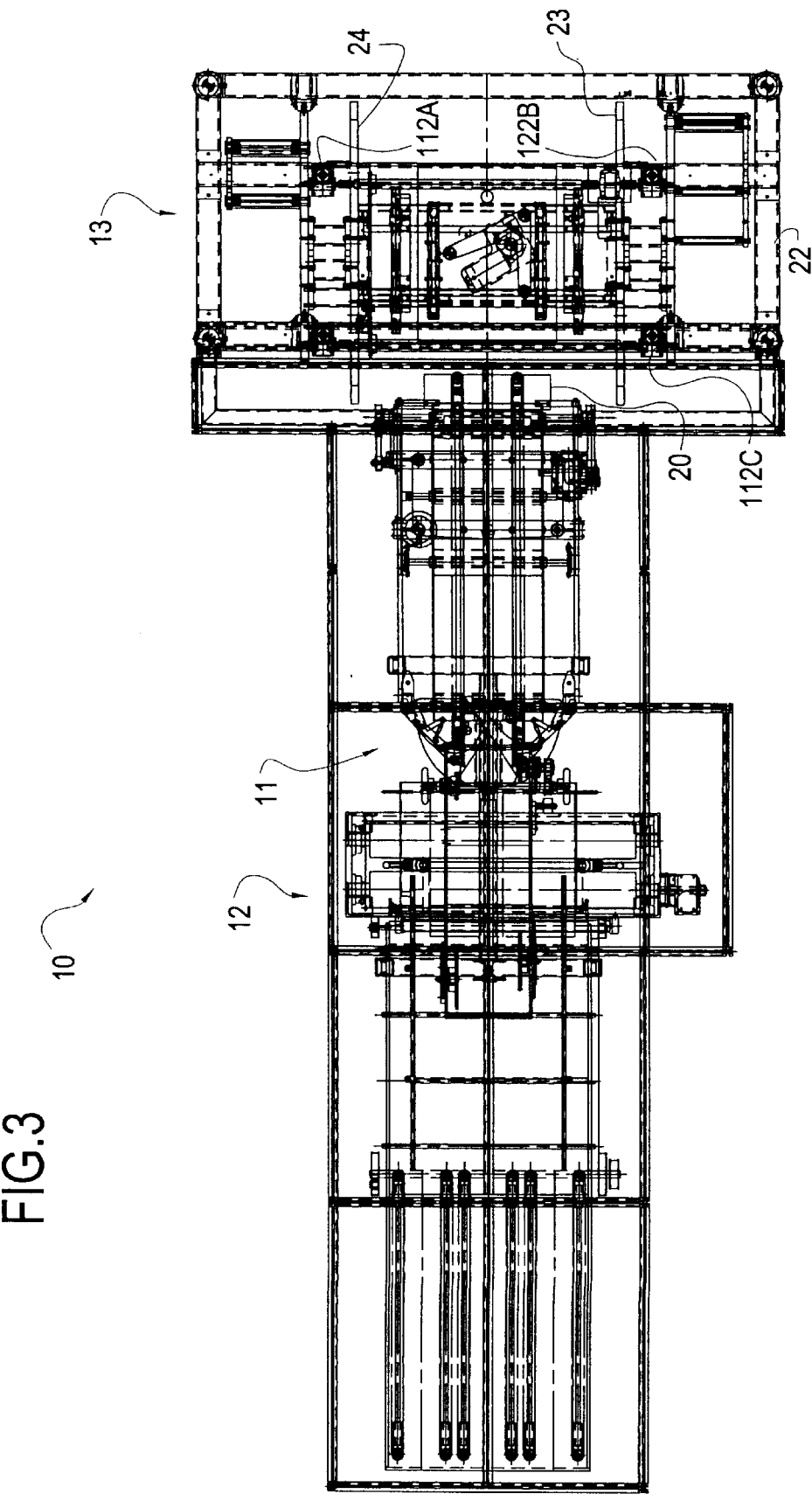
FIG. 3 is a top plan view of the packaging apparatus.

Referring to FIGS. 1–3, a packaging machine 10 includes a girth former section 11, a film unwind section 12 which is positioned in line with respect to the direction of product flow, and a sealing section 13. The packaging machine may also include conventional equipment upstream from the girth former such as a multiple lane product infeed choke belt conveyor and a flighted chain conveyor.

Product is transferred from the flighted chain conveyor to a top conveyor with pushers that push product across a drop away dead plate 14, then into the girth former. Details of the breathable and adjustable girth former are described in U.S. Pat. Nos. 5,255,495 and 5,799,467.

The girth former overwraps the product with continuously unwound plastic film from the unwind 12. The film entubes the product and is overlapped and sealed in a longitudinal direction in a conventional manner. The entubed product is advanced downstream by conveyor side pull belts 16 and by the top and bottom pull elt conveyors 17 and 18.

A fixed plate 20 supports the product as it is transferred from the pull belts to the sealing section 13. The entubed product begins to travel at a slightly reduced speed, causing the pitch between the products to shorten. The film gussets are tacked by conventional timed air blasts simultaneously on each side of the product.

Figure 4:
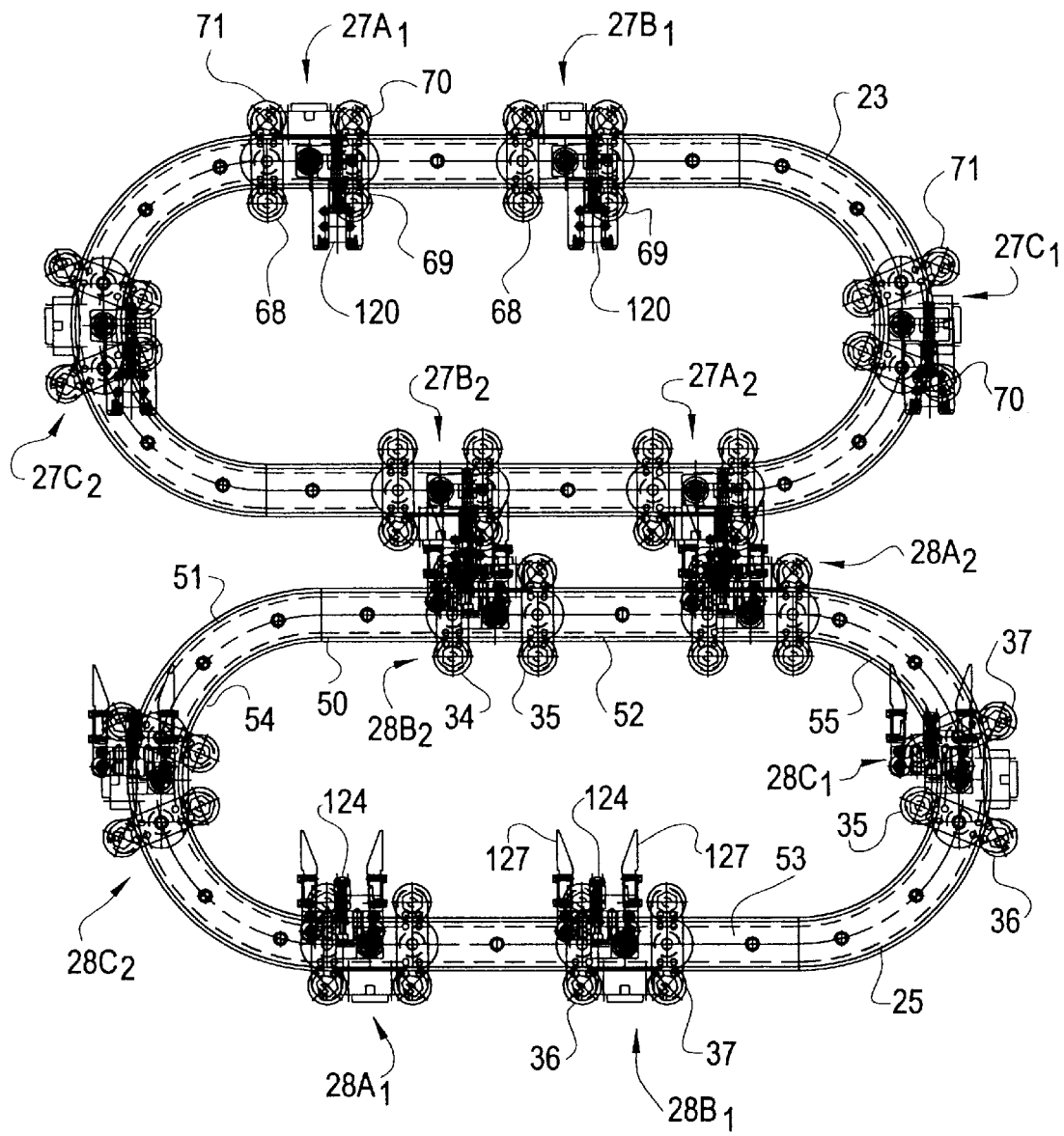
FIG. 4 is a side elevational view of the sealing die assembly of the packaging apparatus.

The sealing section 13 includes a box-like frame 22 and a pair of upper oval tracks 23 and 24 and a pair of lower oval tracks 25 and 26 which are supported by the frame. Referring to FIG. 4, a plurality of top die assemblies 27 ride on the upper tracks, and a plurality of bottom die assemblies 28 ride on the lower tracks.

Figure 5:
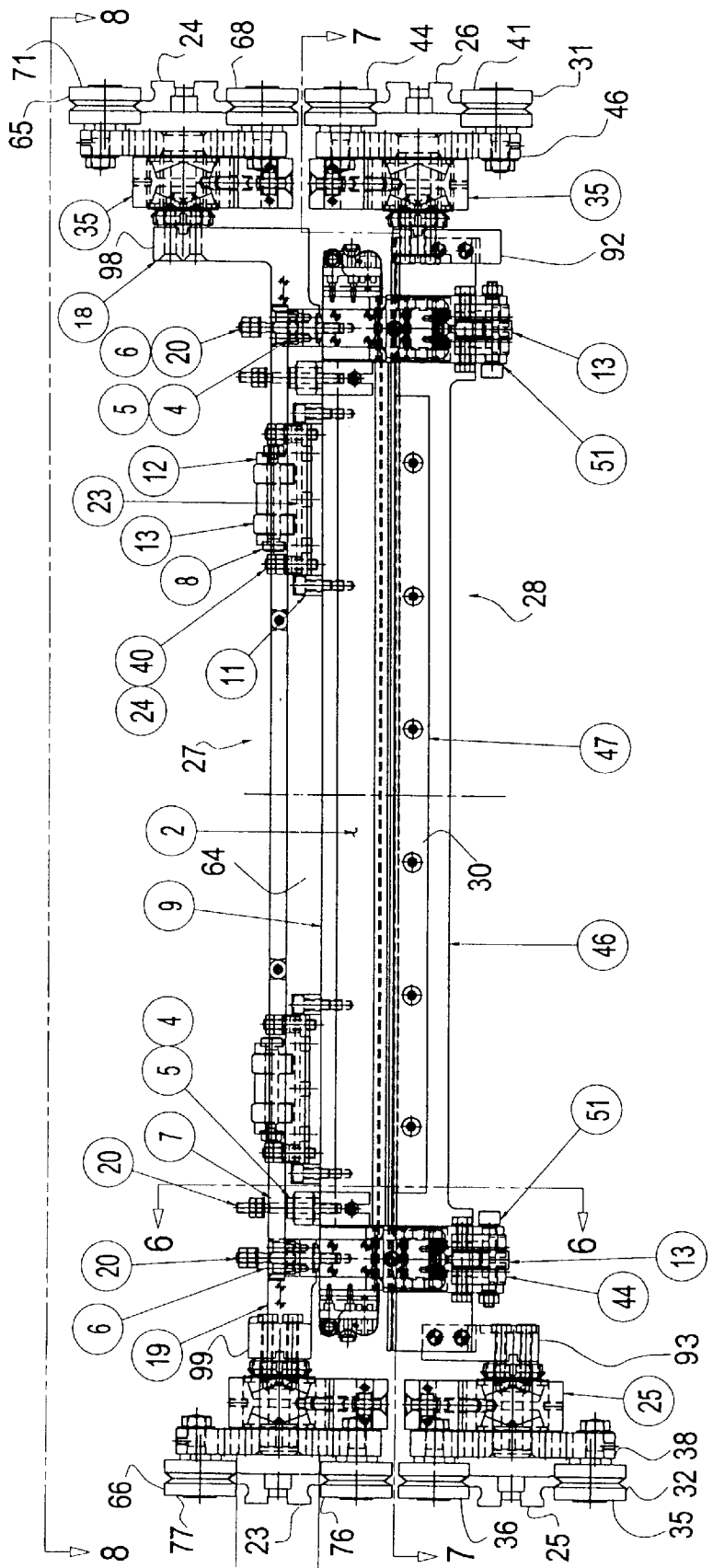
FIG. 5 is a front elevational view of one of the pairs of upper and lower sealing dies.
Figure 6:
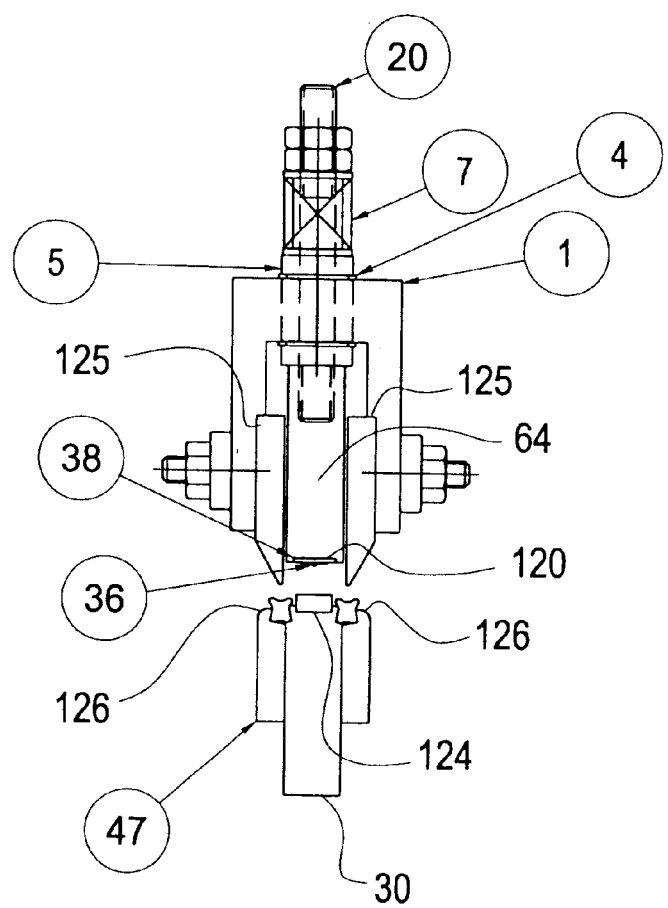
FIG. 6 is a sectional view taken along the line 6—6 of FIG. 5.
Figure 9:
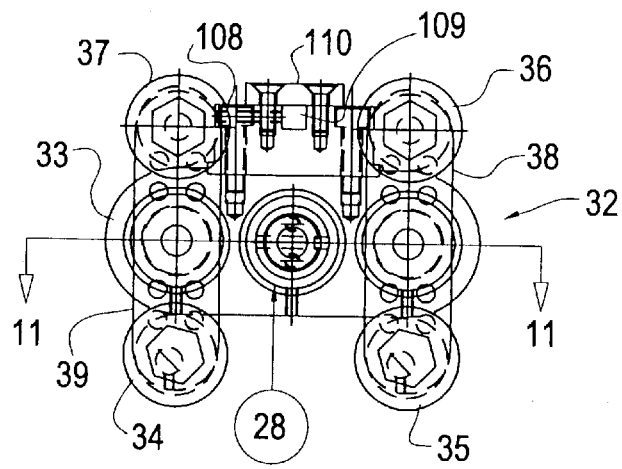
FIG. 9 is a side elevational view, taken along the line 9—9 of FIG. 7, of the carriage for the lower die on the drive side of the machine.
Figure 10:
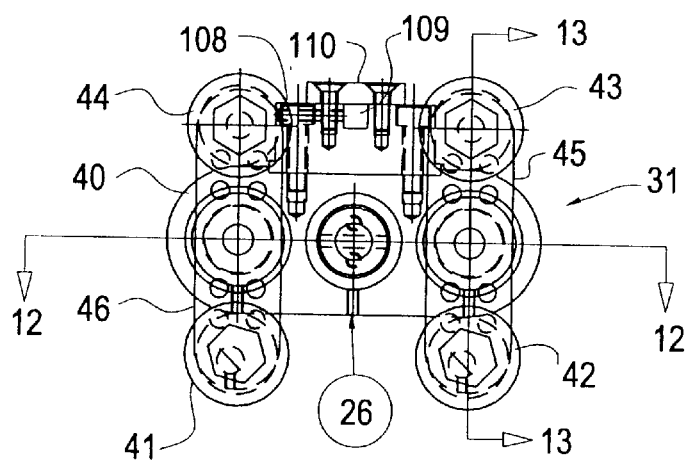
FIG. 10 is a side elevational view, taken along the line 10—10 of FIG. 7, of the lower die on the operator side of the machine.
Figure 11:
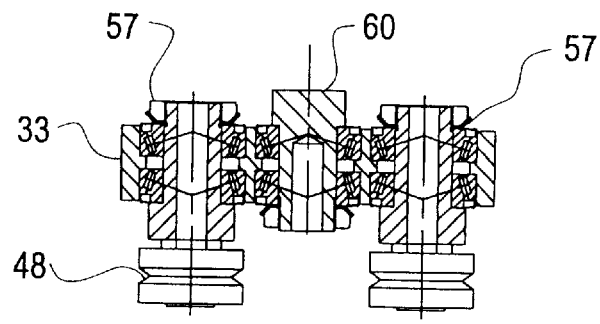
FIG. 11 is a sectional view taken along the line 11—11 of FIG. 9.

Referring to FIG. 5–7, each of the bottom die assemblies 28 includes an elongated sealing bar 30 which is pivotally mounted on carriages 31 and 32. The carriage 32 on the drive side of machine includes a carriage housing 33 (FIG. 9) and four bogie wheels 34–37 which are rotatably mounted on a pair of bogie arms 38 and 39 which are pivotally mounted on the housing. The carriage 31 on the operator side of the machine similarly includes a carriage housing 40 (FIG. 10), four bogie wheels 41–44, and a pair of bogie arms 45 and 46.

Each of the bogie wheels is provided with a V-shaped groove 48 which rides on a V-shaped edge on one of the lower tracks 25 and 26 (see FIGS. 5 and 8). Referring again to FIG. 4, each of the lower tracks includes an inside V-shaped edge 50 and an outside V-shaped edge 51. The inside bogie wheels 34, 35, 41, and 42 ride on the inside edges of the tracks, and the outside bogie wheels 36, 37, 43, and 44 ride on the outside edges of the tracks. Each of the oval tracks includes a pair of upper and lower parallel horizontal straight portions 52 and 53 and a pair of curved arcuate end portions 54 and 55.

Figure 12:
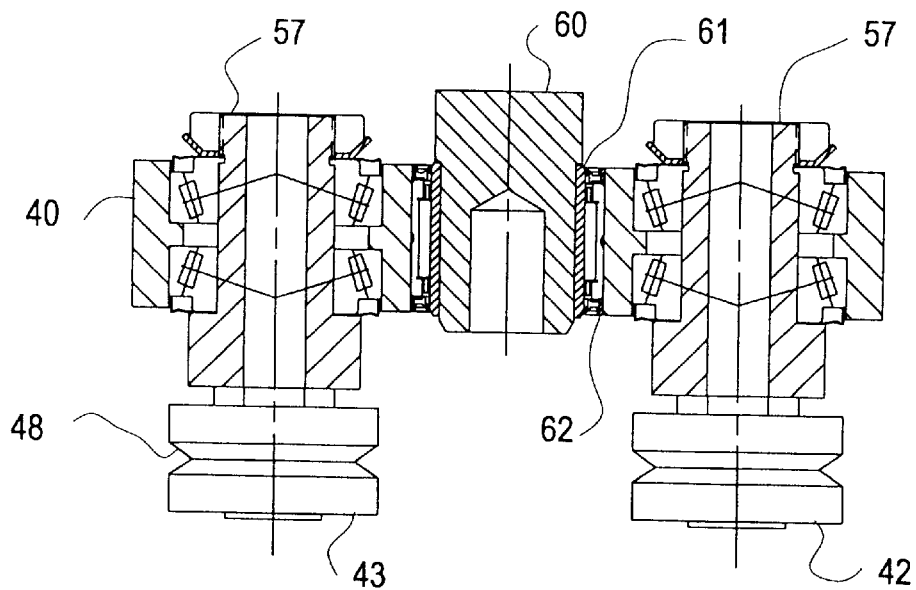
FIG. 12 is a sectional view taken along the line 12—12 of FIG. 10.
Figure 13:
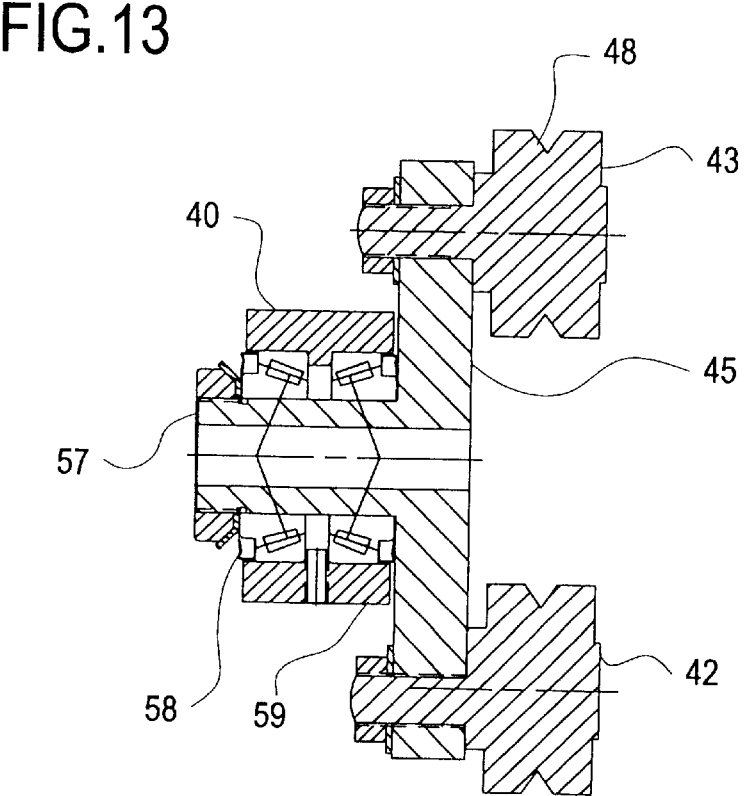
FIG. 13 is a sectional view taken along the line 13—13 of FIG. 10.

Each of the bogie arms 38, 39, 45 and 46 includes a center mounting shaft 57 (FIG. 13) which is pivotally mounted in two bearings 58 and 59 in the carriage housing. As shown in FIG. 4, the pivotable bogie arms pivot as the carriages travel around the curved end portions of the tracks so that all four bogie wheels ride securely on the track. A carriage bearing shaft 60 (FIG. 12) is pivotally mounted in the center of the carriage by two bearings 61 and 62.

Referring to FIGS. 5, 6, and 8, each of the top die assemblies 27 includes an elongated sealing bar 64 which is pivotally mounted in carriages 65 and 66. The carriages 65 and 66 are similar to the carriages 31 and 32. Carriage 65 includes carriage housing 67 and grooved bogie wheels 68–71 which are mounted on pivotable bogie arms 72 and 73. Carriage 66 includes carriage housing 74 and bogie wheels 75–78 which are mounted on bogie arms 79 and 80.

Each bogie arm is pivotally mounted in two bearings in the carriage housing. A carriage bearing shaft 90 is pivotally mounted in the center of the housing by two bearings 91.

Referring to FIG. 4, the inside bogie wheels 68, 69, 75 and 76 ride on the inside V-shaped edges of the upper tracks 23 and 24 and the outside bogie wheels 70, 71, 77 and 78 ride on the outside V-shaped edges of the upper tracks.

The sealing bar 30 of each of the bottom die assemblies includes a pair of end mounting brackets 92 and 93 (FIG. 5) which are secured to the bearing shafts 60 of the carriages 31 and 32. Although the shafts 60 are rotatably mounted in the carriage housings, the sealing bar cannot rotate because the carriages are offset both horizontally and vertically. Referring to FIGS. 14 and 15, the pivot points 95 and 96 of the shafts 60 of the carriages 31 and 32 are offset in the horizontal direction or in the direction of product flow relative to the center of gravity CG of the die assembly by the dimensions A and B, respectively. The pivot points are offset in the vertical direction by the dimensions C and D.

In one specific embodiment the distance between the V grooves in the bogie wheels on each end of the die assembly was 40.06 inches, the dimensions A and B were both 1.5 inches for a total horizontal offset of 3.0 inches, and the dimensions C and D were 2.25 and 0.75 inches for a total vertical offset of 3.0 inches.

The sealing bar 64 of each of the top die assemblies 27 is similarly pivotally secured to the carriage bearing shafts 90 by end brackets 98 and 99 (FIG. 5). The pivot points 100 and 101 (FIGS. 17 and 18) of the carriage bearing shafts 90 are offset horizontally from the center of gravity CG of the die assembly by dimensions E and F and are offset vertically by dimensions G and H. In one specific embodiment the distance between the V grooves of the bogie wheels was 40.06 inches, the dimensions E and F were both 1.50 inches for a total horizontal offset of 3.0 inches, and the dimensions G and H were 4.50 and 1.50 inches for a vertical offset of 3.0 inches.

The two upper tracks 23 and 24 are offset horizontally and vertically by the same amount as the offsets of the carriages for the upper die assembly. The two lower tracks 25 and 26 are similarly offset horizontally and vertically.

Figure 20:
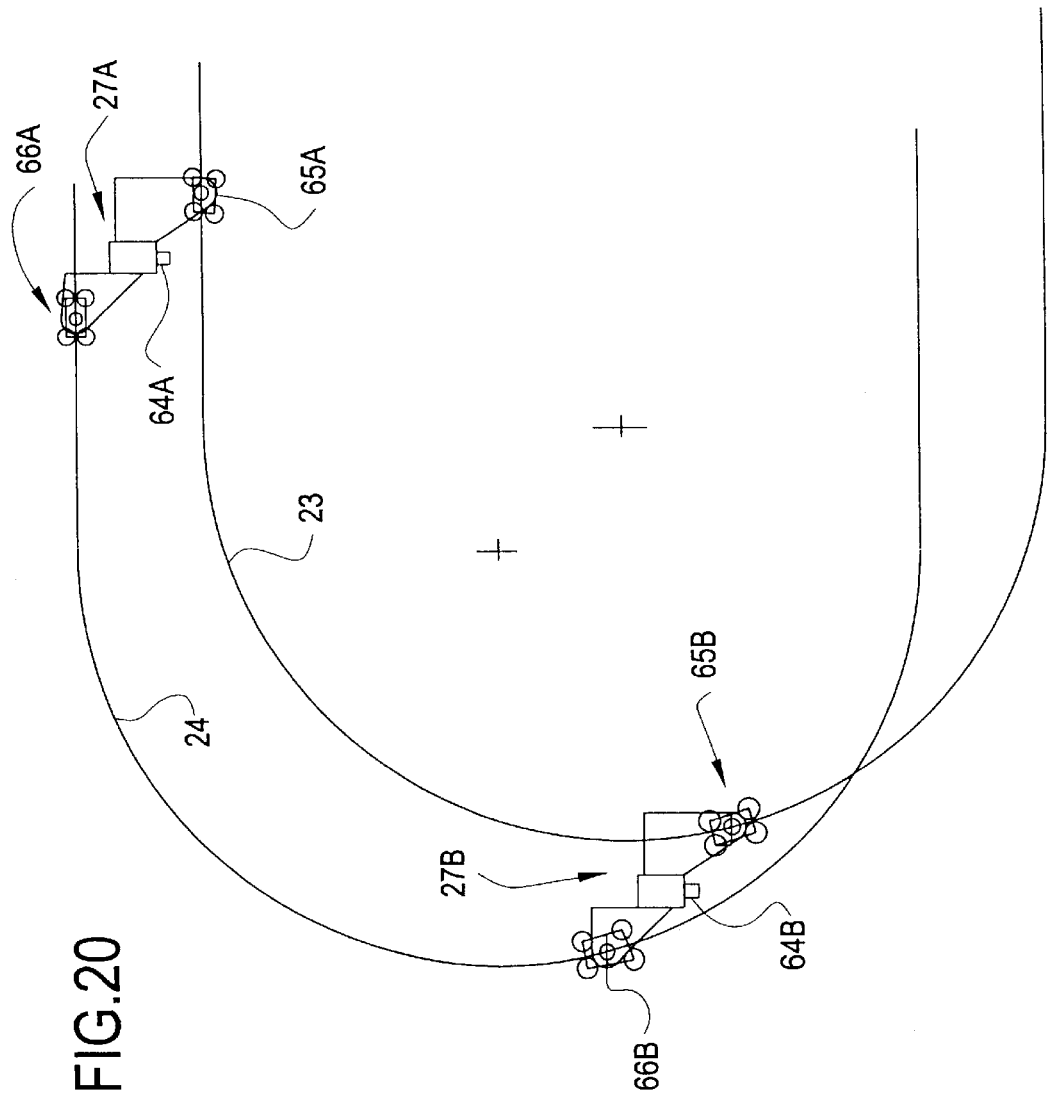
FIG. 20 is a diagrammatical perspective view of the upper tracks and two of the top die assemblies.

The effect of the horizontal and vertical offset is illustrated in FIG. 20, which illustrates top die assemblies 27A and 27B traveling around upper tracks 23 and 24. The relative positions of carriages 65A and 66A and carriages 65B and 66B are maintained throughout the path of travel, and the sealing bars 64A and 64B are thereby always maintained in a vertical position. The lower sealing bars 30 are likewise maintained in vertical position as they travel around the lower tracks.

In the embodiment illustrated in FIG. 4, three pairs of top die assemblies $27A_1$ and $27A_2$, $27B_1$, and $27B_2$, and $27C_1$ and $27C_2$ are mounted on the upper tracks 23 and 24. Each pair of die assemblies is independently driven by one of three top drive belts 105A, 105B, and 105C (FIG. 2) on each side of the sealing section. A drive shaft 106 is attached to each of the drive belts by a connector 107. Each of the drive shafts is connected to one of the carriages by a drive shaft housing 108 (FIGS. 9 and 10) which is secured to the carriage housing. The drive shaft is inserted into a notch 109 in the drive shaft housing and is secured by a cap 110 which is screwed onto the housing.

Each pair of drive belts 105A, 105B, and 105C is driven by a separate servo motor 112A, 112B, and 112C (FIGS. 1 and 2) so that each pair of die assemblies 27A, 27B, and 27C can be driven independently.

In FIG. 4 three pairs of bottom die assemblies $28A_1$ and $28A_2$, $28B_1$, and $28B_2$, and $28C_1$, and $28C_2$ are mounted on the lower tracks 25 and 26 and are driven by bottom drive belts 114A, 114B, and 114C and drive shafts 115 (FIG. 2). The pairs 28A, 28B, and 28C of bottom die assemblies are driven by the servo motors 112A, 112B, and 112C, respectively.

The top and bottom dies 27A and 28A are driven by the same servo motor 112A. The movement of those dies is therefore coordinated, and a top die 27A meets a bottom die 28A as those dies move around the left curved ends of the tracks and approach the horizontal portions of the tracks. Similarly, the top and bottom dies 27B, 27C and 28B, 28C are driven by common servos 112B and 112C, respectively.

The preferred sealing mechanism is illustrated in FIG. 6. An electrical resistance sealing ribbon 120 is mounted on each of the top sealing bars 64. The ribbon includes a pair of flat side portions 121 and a central projection 122 which projects beyond the plane of the side portions.

A compressible and resilient silicone pad 124 is mounted on each of the bottom sealing bars 30. A pair of gripper plates 125 extend downwardly from the top sealing bar and are engageable with compressible and resilient gripper pads 126 on the bottom sealing bar. Each of the bottom sealing bars also includes a pair of upwardly extending, elongated prongs 127 (FIG. 4).

Figure 6A:
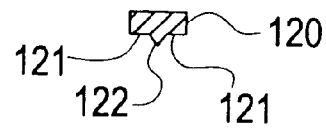
FIG. 6A is an enlarged sectional view of the sealing ribbon of FIG. 6.

The specific sealing ribbon 120 illustrated in FIGS. 6 and 6A is available from Toss Machine Components of Nazareth, Pennsylvania. The ribbon is heated by electric current in order to seal and sever the two layers formed by the plastic film.

As the top and bottom sealing bars close on the film, the prongs 127 and the bottom sealing bar serve to guide the top sealing bar. The film is held by gripper plates 125 on the upper sealing bar which push the film against the gripper pads 126. As the heated sealing ribbon 120 clamps the film against the pad 124, the top and bottom layers of the film are fused. The central projection 122 severs the layers of film between the fused portions.

The sealing bars 27 and 28 seal the film over a very short dimension in the direction of product flow and simultaneously sever the film. The sealing dies therefore require less film for sealing and severing the film than the sealing and cutoff dies of U.S. Pat. No. 5,433,063. The sealing dies 27 and 28 are also much lighter and have less inertia than prior dies. The new sealing dies can therefore moved faster around the tracks.

Figure 21:
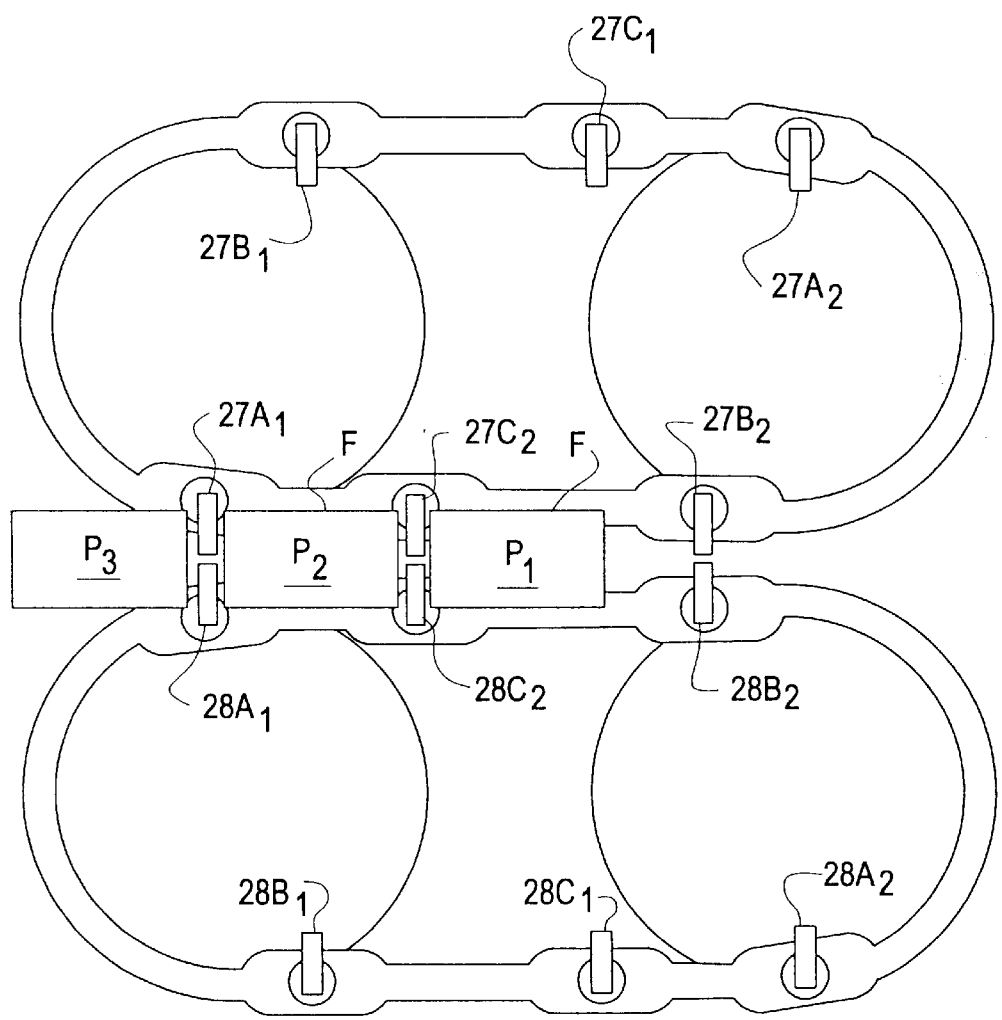
FIGS. 21–25 are diagrammatical illustrations showing the sequence of the sealing operation.

FIGS. 21–25 illustrate the sequence of the sealing operation. FIG. 21 illustrates upper and lower dies $27A_1$ and $28A_1$ coming together and collapsing the tube of film F behind product $P_2$ and beginning to push the product $P_2$ through the sealing section. The film has already been sealed around product $P_1$ in the previous cycle.

Figure 22:
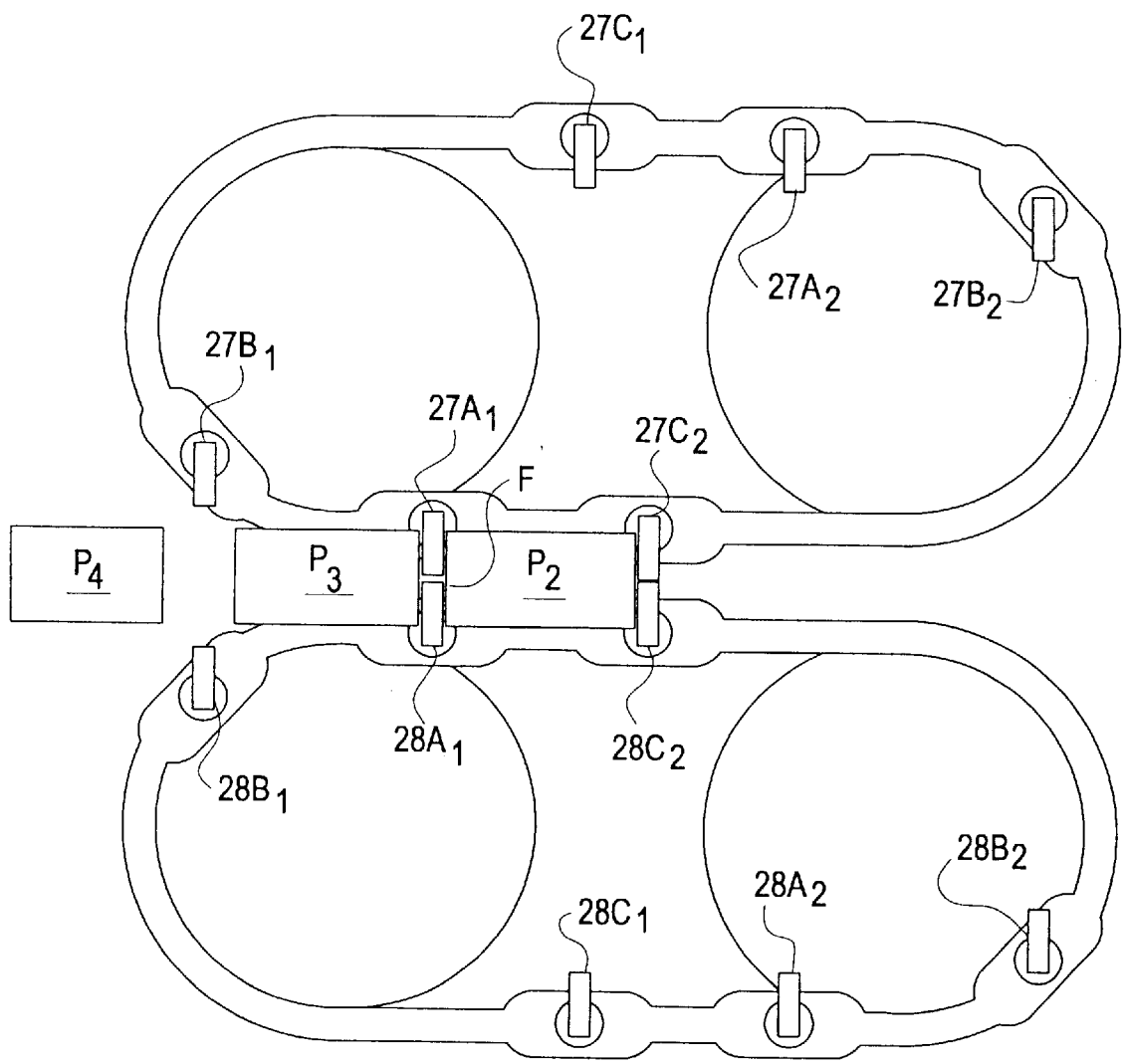

FIG. 22 shows the dies $27A_1$ and $28A_1$ at the beginning of the sealing cycle where the film tube F has been impinged between the upper and lower dies and the dies continue to push the product $P_2$ through the sealing section. A new product $P_3$ moves in behind the dies $27A_1$ and $28A_1$.

Figure 23:
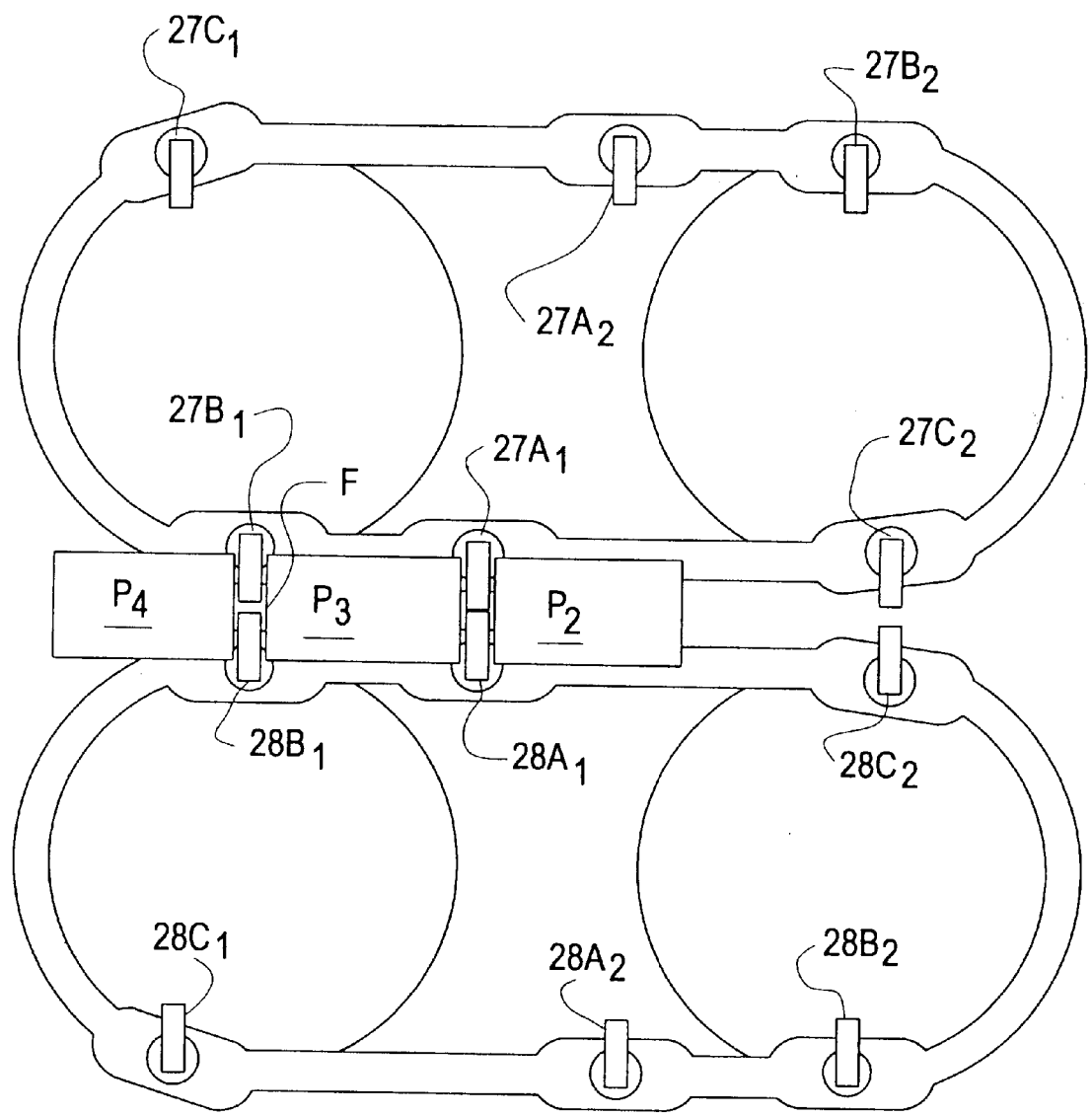

In FIG. 23 the dies $27A_1$ and $28A_1$ are positioned midway through the sealing cycle. Dies $27B_1$ and $28B_1$ collapse the film F behind product $P_3$. A new product $P_4$ moves up.

Figure 24:
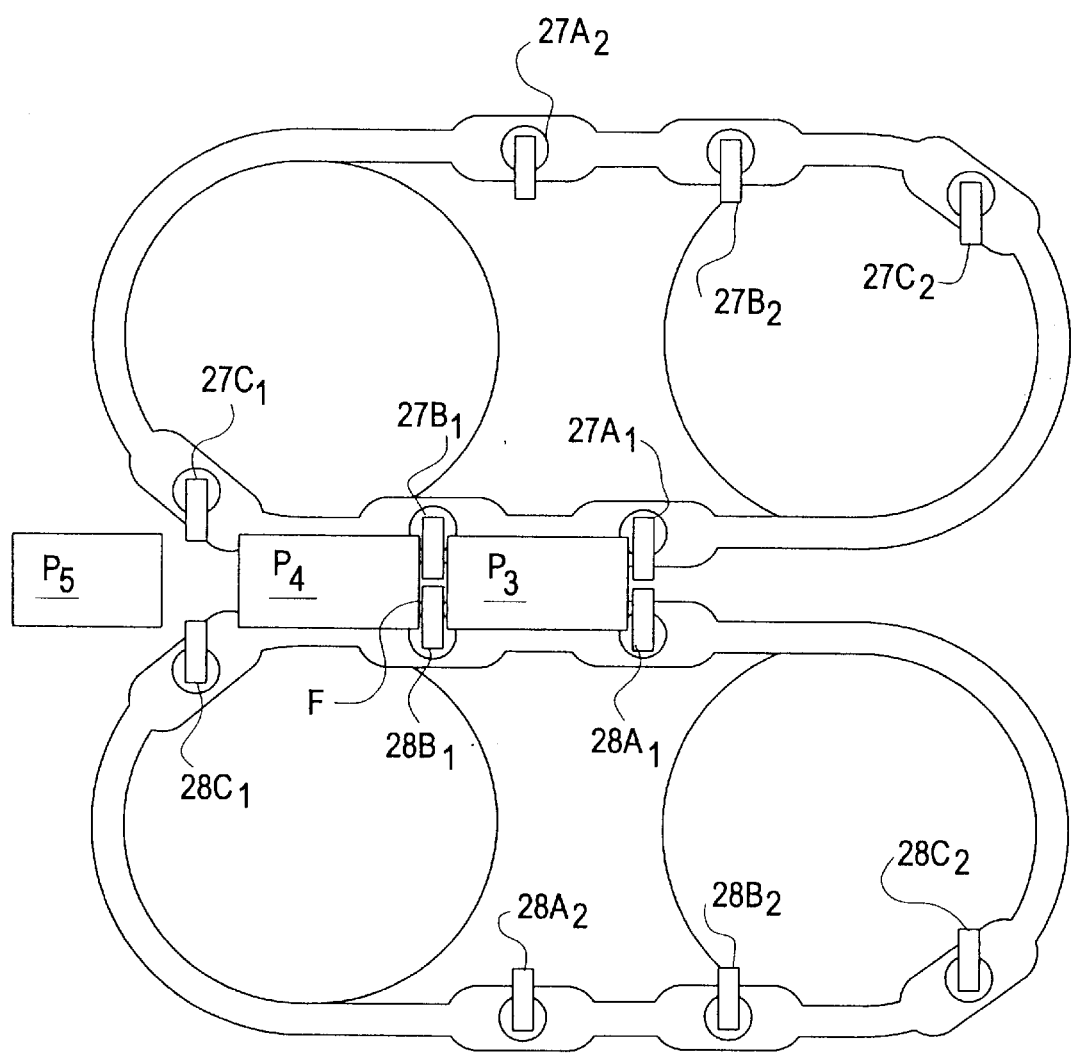

In FIG. 24 the sealing and cutting process of dies $27A_1$, and $28A_1$ is completed. The dies $27A_1$ and $28A_1$ are ready to be accelerated away from the product $P_3$. The dies $27A_2$ and $28A_2$ are driven by the same drive belt as the dies $27A_1$ and $28A_1$, respectively, and will be accelerated toward the new product to be in position to collapse the tube of film on a new product. At the same time, the completely sealed and cut package $P_2$ is discharged out of the sealing section. Dies $27B_1$ and $28B_1$ are in the process of sealing the film behind product $P_3$. Dies $27C_1$ and $28C_1$ collapse the film tube behind the product $P_4$.

Figure 25:
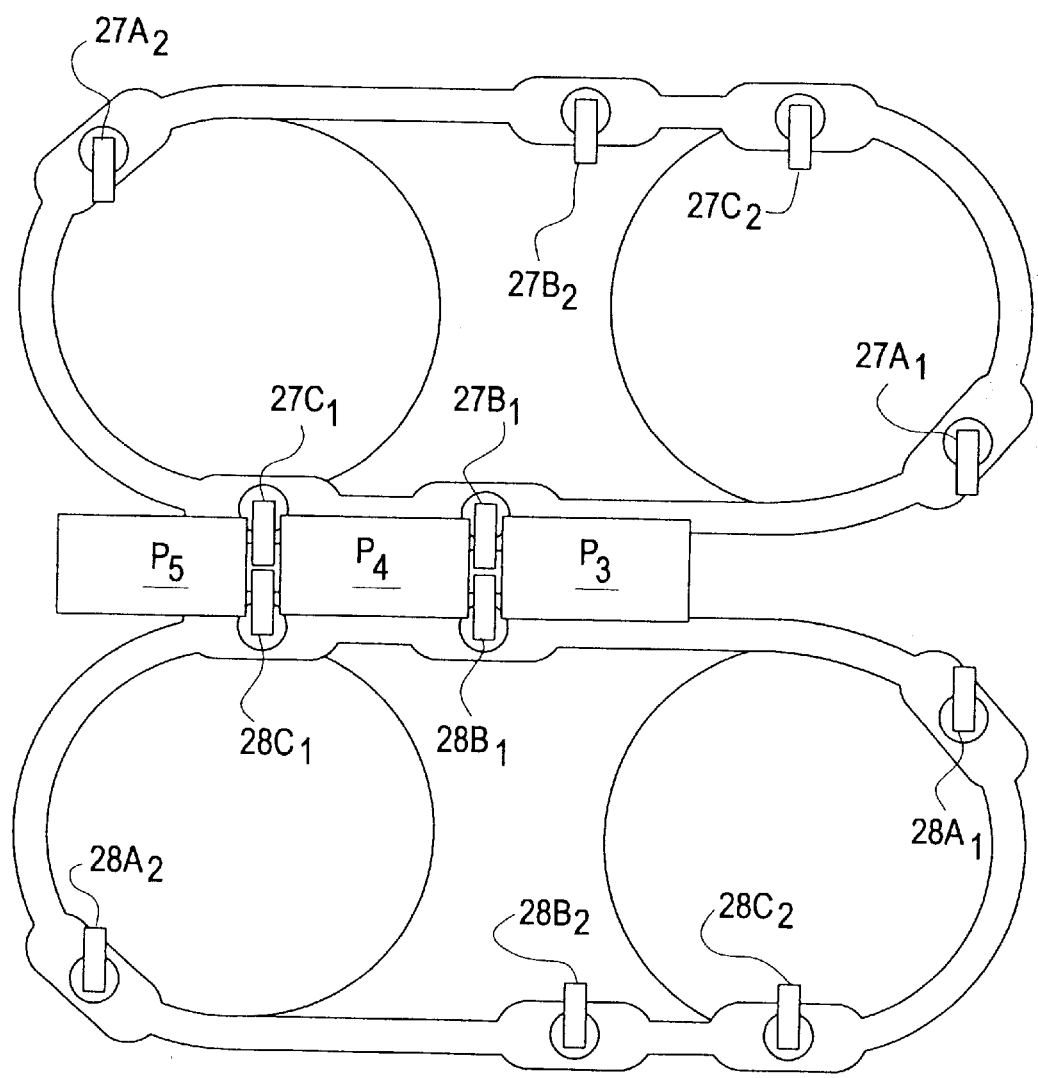

In FIG. 25 the sealing process is being completed for package $P_3$, and the upper and lower dies $27A_2$ and $28A_2$ slow down to begin to repeat the sealing process on product $P_5$.

Figure 26:
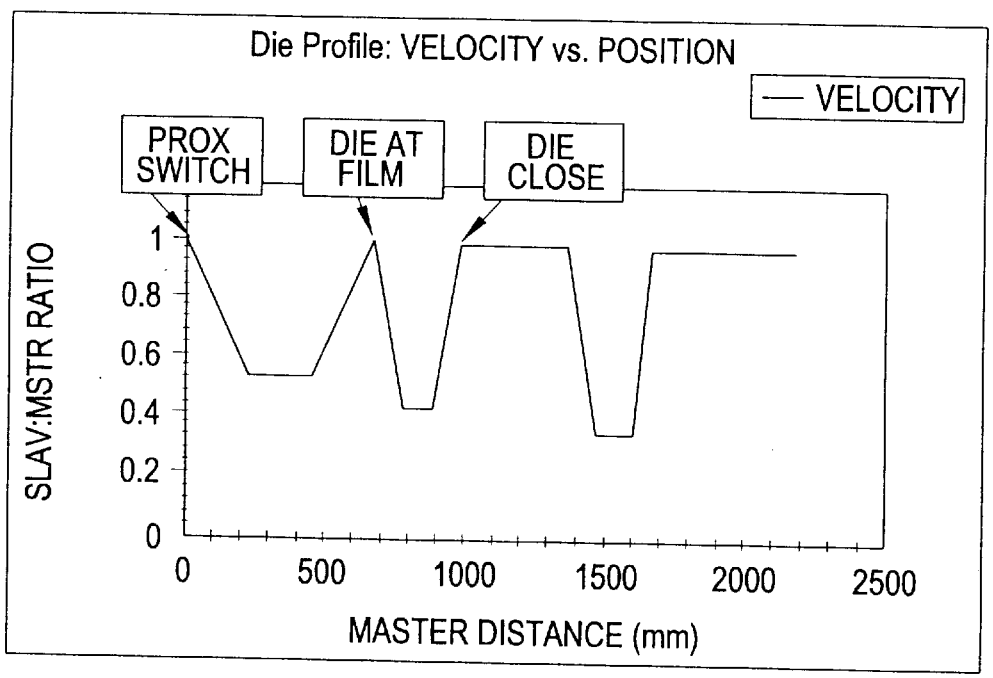
FIG. 26 is a graph of the motion profile of prior art sealing dies.
Figure 27:
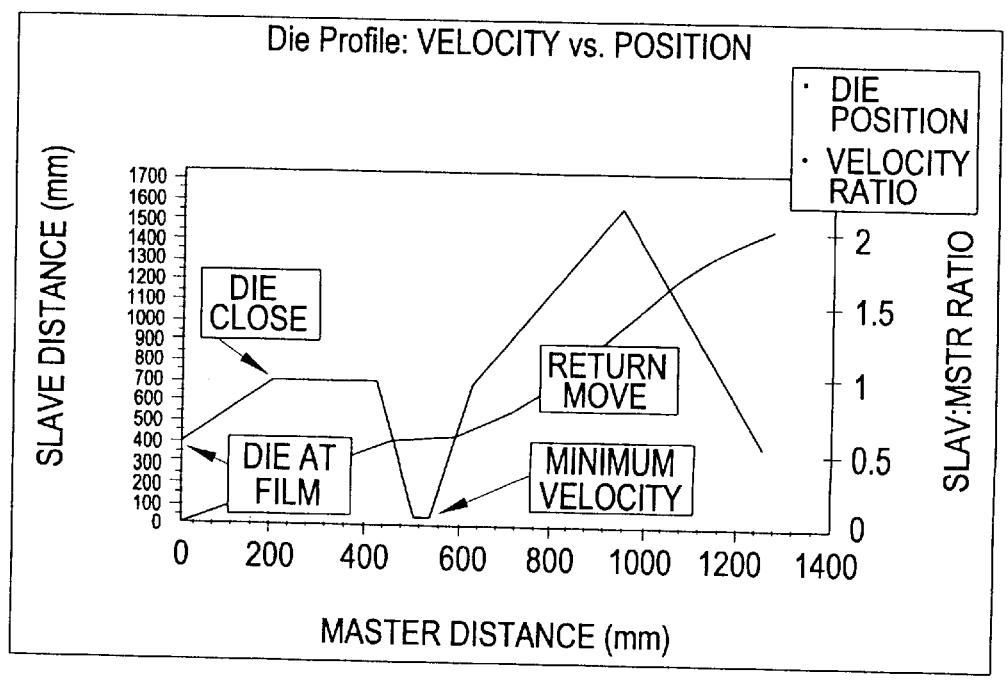
FIG. 27 is a graph of the preliminary quadratic motion profile of the sealing dies of the invention.
Figure 28:
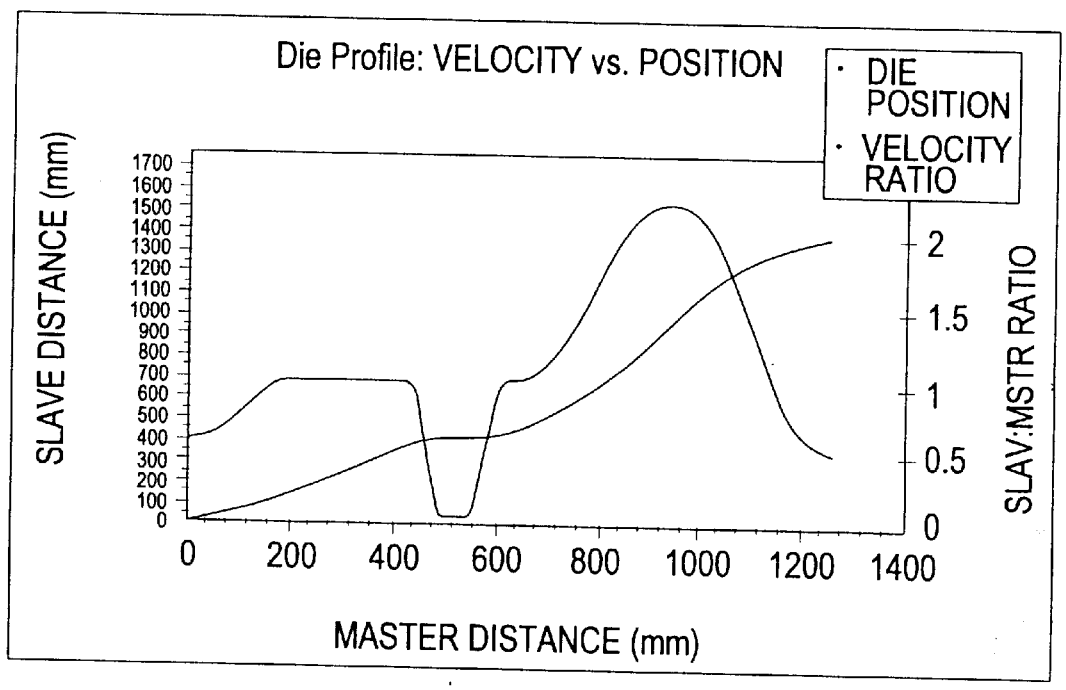
FIG. 28 is a graph of the final cubic motion profile of the sealing dies of the invention.

FIGS. 26–28 compare the motion profiles of the prior art dies described in U.S. Pat. No. 5,433,063 and the dies of this invention. In the prior art, as illustrated in FIG. 26, the velocity of the dies is equal to the film velocity as the die halves make contact with the film. The die halves then slow down to collapse the film between the products. As each die continues around the radius of the pulley, it begins to accelerate back to film velocity. Each die half, with a product in front of it, will travel at film velocity until the next die half touches the film. Then the first die half will decelerate to allow the next die half to collapse the film tube. After that die half finishes collapsing the film tube, both will accelerate back to film velocity.

The new profile illustrated in FIG. 27 is first developed as a quadratic profile with the eventual conversion to cubic motion as a major consideration. The previous art illustrated in FIG. 26 divided all speed up or slow down moves into standard trapezoidal motion where the master distance is evenly divided by three. The new profile calculations attempt to divide the moves evenly in two with the realization that the peak changes of acceleration will be smoothed out with the cubic motion conversion. Sometimes, however, a maximum or minimum velocity will force the addition of a third segment. The die during this segment will travel at this velocity limit for the minimum distance necessary and then resume acceleration. This keeps the acceleration rates at a minimum while remaining within velocity limits.

After this quadratic profile is calculated, it is then converted to the more complex cubic motion profile illustrated in FIG. 28. Each segment of the quadratic profile that contains a change in velocity is divided in half, and the acceleration is distributed such that it is increasing during the first half and decreasing during the second half. This results in a curved velocity profile that significantly reduces abrupt changes in acceleration which, in turn, reduces mechanical stress on the moving parts and undesirable motion of the half dies as they touch the film and come together at the beginning of sealing.

Figure 29:
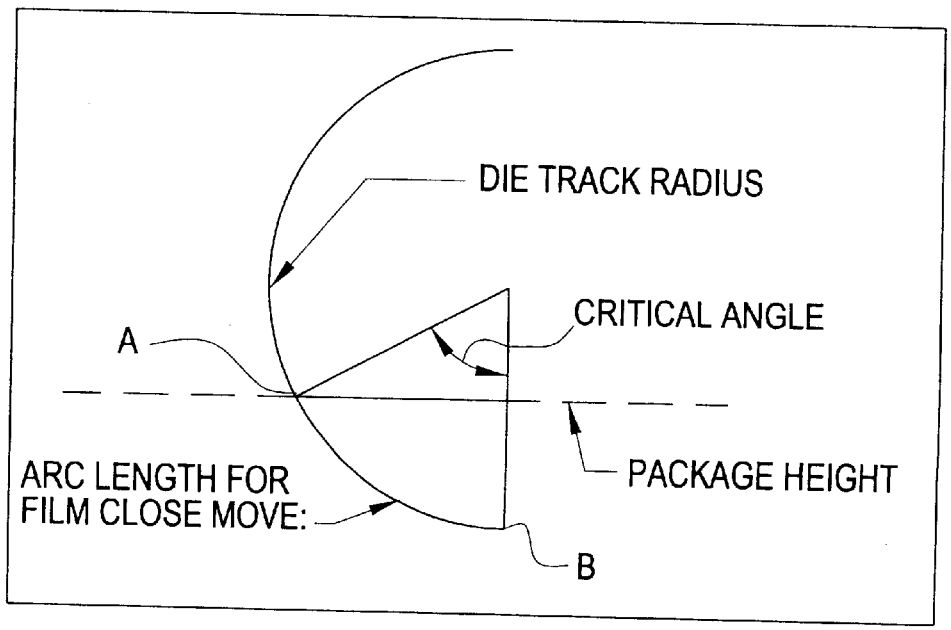
FIG. 29 illustrates the critical angle of the motion of the top dies.
Figure 30:
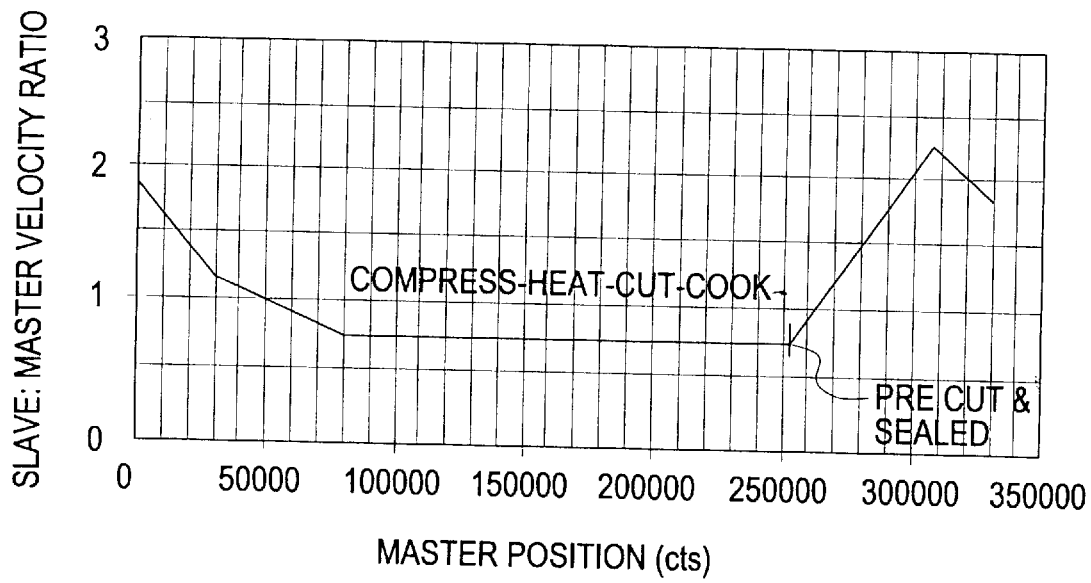
FIG. 30 is a graph of the motion profile of the dies of the invention.
Figure 31:
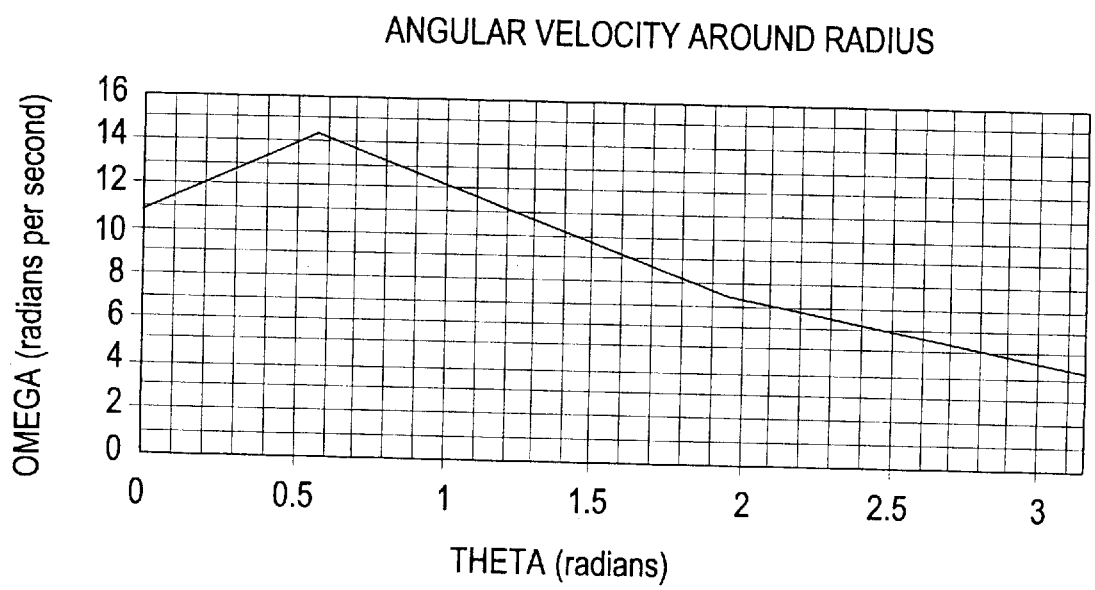
FIG. 31 is a graph of the angular velocity of the dies of the invention.

FIG. 29 illustrates the arcuate end portion of one of the upper tracks and the height of the package and the film tube. The upper die first touches the film at point A and must decelerate from film velocity to product velocity in the distance from point A until the die reaches bottom-dead-center on the arcuate end portion of the track at point B. The angle between points A and B is referred to as the critical angle. The arc length that the die travels over the critical angle is the critical angle distance.

The path of the lower die is the mirror image of the path of the upper die. The lower die contacts the bottom of the film tube as the lower die moves upwardly along the arcuate end portion of the lower track and decelerates until the lower die reaches the top-dead-center position on the radius of the arcuate portion of the track.

As the upper die half reaches the bottom of the radius, it approaches the package velocity. The die half will continue to travel at the package velocity for the distance specified as the seal distance. During this part of the travel, the package will be sealed and cut from the continuous tube of film. After the seal distance, the die half will accelerate to travel the remaining distance of the track to be in position for the next product.

The motion profile provides a continuous change in deceleration of the die half through the critical angle distance. This motion provides for a smoother collapse of the film tube and transition into the seal distance.

The invention provides an in-line gusseted trim seal style package and provides higher operating speeds, film savings, and additional area on the end panel to print advertising.

Figure 32:
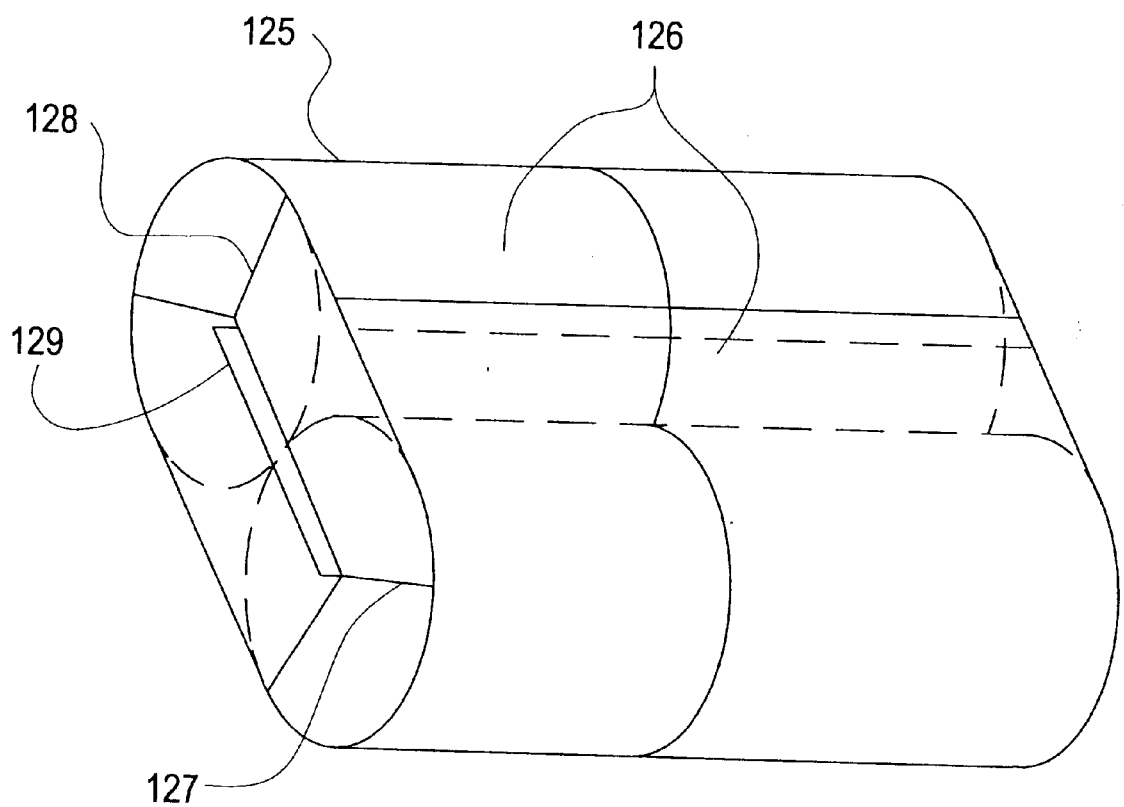
FIG. 32 is a perspective view of a package of rolls of bathroom tissue which is packaged and sealed by the sealing apparatus of the invention.

FIG. 32 illustrates a package 125 of four rolls 126 of bathroom tissue. The ends of the package are closed by gussets 127 and 128 and sealed by trim seals 129.

While in the foregoing specification a detailed description of a specific embodiment of the invention was set down for the purpose of illustration, it will be understood that many of the details hereingiven can be varied considerably by those skilled in the art without departing from the spirit and scope of the invention.

We claim:

1. A sealing apparatus for sealing a film to form a package which moves along a path having right and left sides, the sealing apparatus comprising:

right and left upper tracks which are spaced apart transversely with respect to said path, right and left lower tracks which are spaced apart transversely with respect to said path, each of said tracks having upper and lower portions which are generally parallel to said path and a pair of curved end portions which connect the upper and lower portions, the lower portions of the upper tracks being adjacent to the upper portions of the lower tracks, a plurality of upper die assemblies mounted for movement on the upper tracks, each of the upper die assemblies including a right carriage and a left carriage which are supported by the right and left upper tracks, respectively, and an upper die which extends between the carriages, a plurality of lower die assemblies mounted for movement on the lower tracks, each of lower die assemblies including a right carriage and a left carriage which are supported by the right and left lower tracks, respectively, and a lower die which extends between the carriages, each of the upper die assemblies being associated with one of the lower die assemblies to form a pair of upper and lower die assemblies, means for moving each pair of die assemblies around the upper and lower tracks so that the die assemblies of each pair meet and travel together along said adjacent portions of the tracks, each of the upper and lower die assemblies includes a right carriage and a left carriage, each of the upper and lower dies being pivotally connected to a right carriage at a right pivot point and being pivotally connected to a left carriage at a left pivot point, the right and left pivot points of each die being offset both in the direction of said path and in a direction which is transverse to said path whereby each die is maintained in a substantially constant orientation as the die moves around the tracks.

2. The sealing apparatus of claim 1 in which each of said carriages includes a plurality of wheels which ride on the associated track.

3. The sealing apparatus of claim 1 in which each of the tracks includes an inside support surface and an outside support surface and each of said carriages includes inside and outside wheels which ride on said inside and outside support surfaces.

4. The sealing apparatus of claim 1 in which each of the tracks includes an inside support surface and an outside support surface and each of said carriages includes a housing, a pair of bogie arms pivotally mounted on the housing, and inside and outside wheels rotatably mounted on each of the bogie arms which ride on said inside and outside support surfaces.

5. The sealing apparatus of claim 1 in which one of the dies of each pair of die assemblies includes a heating wire and the other die of the pair includes a resilient pad.

6. The sealing apparatus of claim 1 in which said means for moving each pair of die assemblies includes a separate drive mechanism for each pair of die assemblies, said drive mechanisms being operable independently of each other.

7. The sealing apparatus of claim 1 in which each of the curved end portions of the tracks curves along a radius of a circle.

8. The sealing apparatus of claim 1 in which the upper tracks are offset in a direction which extends perpendicularly to the upper and lower portions of the tracks and the lower tracks are offset in a direction which extends perpendicularly to the upper and lower portions of the tracks.

9. A sealing apparatus for sealing a film to form a package which moves along a path comprising:
   a pair of upper tracks which are spaced apart transversely with respect to said path,
   a pair of lower tracks which are spaced apart transversely with respect to said path,
   each of said tracks including an inside support surface and an outside support surface, upper and lower portions which are generally parallel to said path, and a pair of curved end portions which connect the upper and lower portions, the lower portions of the upper tracks being adjacent to the upper portions of the lower tracks,
   a plurality of upper die assemblies mounted for movement on the upper tracks, each of the upper die assemblies including a pair of carriages which are supported by the upper tracks and an upper die which extends between the carriages,
   a plurality of lower die assemblies mounted for movement on the lower tracks, each of lower die assemblies including a pair of carriages which are supported by the lower tracks and a lower die which extends between the carriages,
   each of the upper die assemblies being associated with one of the lower die assemblies to form a pair of upper and lower die assemblies, and
   means for moving each pair of die assemblies around the upper and lower tracks os that the die assemblies of each pair meet and travel together along said adjacent portions of the tracks,
   each of said carriages including a housing, a pair of bogie arms pivotally mounted on the housing, and inside and outside wheels rotatably mounted on each of the bogie arms which ride on said inside and outside support surfaces.

10. A method of sealing a series of products in a film comprising:
   mounting upper sealing dies on a pair of upper oval tracks and mounting lower sealing dies on a pair of lower oval tracks, each of the tracks having upper and lower portions and front and rear curved end portions which connect the upper and lower portions,
   advancing the products along a path which extends between the upper tracks and between the lower tracks, each of the products having a front, a rear, a top which is between the upper and lower portions of the upper tracks, and a bottom which is between the upper and lower portions of the lower tracks,
   wrapping the products in a film and advancing the film with the products, the film being advanced at a faster velocity than the velocity at which the products are advanced,
   moving a first upper die and a first lower die along the curved rear end portions of the upper and lower tracks at substantially the same velocity as the velocity of the film to engage the film behind the rear of a first product ahead of the front of a second product and to push the film toward the rear of the first product and then decelerating the upper and lower dies so that the dies substantially reach the velocity of the products as the dies reach the end of the curved rear end portions of the tracks, and
   moving the first upper die along the lower portion of the upper track and moving the first lower die along the upper portion of the lower track and using the dies to seal the film between the first upper and lower dies and to sever the film.

11. The method of claim 10 including the step of moving the upper and lower dies at substantially the velocity of the products while the dies seal and sever the film.

12. The method of claim 11 including the step of accelerating the upper and lower dies after they sever the film.

13. The method of claim 10 including the steps of maintaining the upper dies in substantially the same orientation as the upper dies move along the upper track and maintaining the lower dies in substantially the same orientation as the lower dies move along the lower track.

14. A method of sealing a series of products in a film comprising:
   advancing the products along a path,
   wrapping the products in a tube of film and advancing the film tube in the direction of said path at a faster velocity than the velocity of the products,
   moving upper and lower sealing dies toward each other and also in the direction of said path so that the dies contact the film tube between first and second products, the upper and lower dies being advanced at substantially the velocity of the film tube when the dies contact the film tube,
   decelerating the upper and lower dies as the dies continue to move toward each other and also in the direction of said path to collapse the film tube between the dies behind said first product, advancing the upper and lower dies at substantially the velocity of the products and sealing and severing the film tube between the upper and lower dies, and accelerating the upper and lower dies away from the second product.

15. The method of claim 14 in which the upper and lower dies move along curved paths between the time when the dies contact the film tube and the time when the film tube is collapsed between the dies.

16. A method of sealing a series of products in a film comprising:

mounting right and left upper carriages on right and left upper oval tracks and mounting right and left lower carriages on right and left lower oval tracks, each of the tracks having upper and lower portions and front and rear curved end portions which connect the upper and lower portions, pivotally connecting an upper sealing die to the right upper carriage at a right pivot point and to the left upper carriage at a left pivot point so that the right and left pivot points are offset both in a direction which extends parallel to the upper and lower portions of the tracks and in a direction which extends transversely to the upper and lower portions of the tracks, pivotally connecting a lower sealing die to the right lower carriage at a right pivot point and to the left lower carriage at a left pivot point so that the right and left pivot are offset both in a direction which extends parallel to the upper and lower portions of the tracks and in a direction which extends transversely to the upper and lower portions of the tracks, wrapping the products in a film and advancing the film with the products, moving the upper and lower carriages around the upper and lower tracks while maintaining the offset between the right and left pivot points of the upper and lower dies so that each of the upper and lower dies is maintained in a constant orientation relative to said path, and sealing the film between the upper and lower dies as the upper die moves along the lower portions of the upper tracks and the lower die moves along the upper portions of the lower tracks.

\* \* \* \* \*